United States Patent
Beringer et al.

(10) Patent No.: US 7,577,964 B2
(45) Date of Patent: Aug. 18, 2009

(54) SYSTEM AND METHODS FOR DEFINING A BINDING FOR WEB-SERVICES

(75) Inventors: Dorothea Beringer, Sergy (FR); Guillaume Vambenepe, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 945 days.

(21) Appl. No.: 10/376,570

(22) Filed: Feb. 28, 2003

(65) Prior Publication Data

US 2004/0205765 A1 Oct. 14, 2004

(51) Int. Cl.
*G06F 9/44* (2006.01)
(52) U.S. Cl. .................. 719/328; 719/330; 719/331; 719/332; 717/102
(58) Field of Classification Search .............. 719/328, 719/331, 332, 330; 709/201; 705/26; 717/102
See application file for complete search history.

(56) References Cited

U.S. PATENT DOCUMENTS

| | | | |
|---|---|---|---|
| 5,850,520 A * | 12/1998 | Griebenow et al. ......... 709/206 |
| 6,154,738 A * | 11/2000 | Call ............................ 707/4 |
| 7,111,076 B2 * | 9/2006 | Abjanic et al. ............. 709/246 |
| 2002/0107680 A1 * | 8/2002 | Duggan et al. ............... 703/22 |
| 2003/0191803 A1 * | 10/2003 | Chinnici et al. ............ 709/203 |
| 2004/0049590 A1 * | 3/2004 | Collier et al. .............. 709/230 |
| 2004/0060054 A1 * | 3/2004 | Das et al. .................... 719/310 |
| 2004/0111466 A1 | 6/2004 | Beringer et al. |
| 2004/0172555 A1 | 9/2004 | Beringer et al. |

OTHER PUBLICATIONS

Siddiqui, Deploying Web services with WSDL, Part 2: Simple Object Access Protocol (SOAP), Mar. 2000, pp. 1-15.*
Christensen, "Web Service Description Language (WSDL) 1.1", Mar. 2001, pp. 1-51.*
Ogbuji, "Using WSDL in SOAP applicants", Nov. 2000, pp. 1-6.*
"Web Service Description Usage Scenarios", Jun. 2002, W3C draft 4, pp. 1-23.*
World Wide Web, http://www.microsoft.com/hk/vstudio/launch/download/SVR349.ppt Hugo Sin, "Orchestrating Public XML Web Services with BizTalk Server 2002," Mar. 7, 2002, 49 pages.
World Wide Web, http://www-106.ibm.com/developerworks/library/ws-peer4/ Graham Glass, "The web services (r)evolution: Part 4," Feb. 2001, printed on Dec. 9, 2002, 11 pages.
World Wide Web, http://www-106.ibm.com/developerworks/library/ws-soap/index.html Uche Ogbuji, "Using WSDL in Soap applications," Nov. 2000, printed on Dec. 9, 2002, 6 pages.
World Wide Web, http://www.106.ibm.com/developerworks/library/ws-intwsdl2/ Bilal Siddiqui, Deploying Web services with WSDL, Part 2: Simple Object Access Protocol (SOAP), Mar. 2002, printed on Dec. 9, 2002, 15 pages.

(Continued)

*Primary Examiner*—Li B Zhen
*Assistant Examiner*—Phuong N Hoang

(57) ABSTRACT

In accordance with an embodiment of the present invention, a web-services interface for a web-service comprises a message binding extension element operable to specify a format for a message requesting the web-service and a binding details extension element operable to specify an availability status of at least one receipt for the message.

44 Claims, 6 Drawing Sheets

OTHER PUBLICATIONS

World Wide Web, http://www.topxml.com/b2b/articles/biztalk_unleashed/1_intro.asp "TopXML, Introduction to BizTalk", printed on Dec. 9, 2002, 5 pages.

World Wide Web, http://searchdatabase.techtarget.com/sDefinition/0,,sid13_gci212944,00.html "SearchDatabase.com Definitions, schema," printed on Dec. 9, 2002, 2 pages.

World Wide Web, http://searchwin2000.techtarget.com/sDefinitions/0,,sid1_gci214535,00.html "SearchWin2000.com Definitions, Biztalk," printed on Dec. 9, 2002, 3 pages.

World Wide Web, http://searchwebservices.techtarget.com/sDefinition/0,,sid26_gci521683,00.html "SearchWebServices.com Definitions, Web Services Description Language", printed on Dec. 9, 2002, 3 pages.

World Wide Web, http://searchwebservices.techtarget.com/sDefinition/0,,sid26_gci508228,00.html "SearchWebServices.com Definitions, UDDI," printed on Dec. 9, 2002, 3 pages.

World Wide Web, http://searchwebservices.techtarget.com/sDefinition/0,,sid26_gci214295,00.html "SearchWebServices.com Definitions, Simple Object Access Protocol," printed on Dec. 9, 2002, 3 pages.

World Wide Web, http://www.zdnet.com/filters/printerfriendly/0,6061,2859619-92,00.html Daniel Sholler, "Web Services: Stages of adoption", Apr. 9, 2002, printed on May 13, 2002, 3 pages.

World Wide Web, http://www.topxml.com/soap/articles/tk2/ Christian Weyer, eYesoft, "Implementing a Web Service with Microsoft SOAP Toolkit Version 2.0," printed on Dec. 9, 2002, 9 pages.

World Wide Web, http://www.topxml.com/soapworkshop/articles/intro/default.asp Paola Di Maio, <soap:workshop/>, "Introducing SOAP", Feb. 26, 2001, printed on Dec. 9, 2002, 2 pages.

World Wide Web, http://www.topxml.com/soapworkshop/articles/intro/page3.asp Bob Luhrs, <soap:workshop/>, "Transports and RPC," Feb. 26, 2001, printed on Dec. 9, 2002, 3 pages.

World Wide Web, http://www.topxml.com/b2b/articles/biztalk_unleashed/7_concepts.asp "BizTalk concepts," printed on Dec. 9, 2002, 4 pages.

World Wide Web, http://www.topxml.com/b2b/articles/biztalk_unleashed/9_messagesanddocuments.asp "Concepts & Architecture," printed on Dec. 9, 2002, 6 pages.

World Wide Web, http://www.w3.org/TR/wsc110/ Arindam Banerji, et al., "Web Services Conversation Language (WSCL) 1.0" Mar. 14, 2002, printed on Dec. 9, 2002, 24 pages.

World Wide Web, http://msdn.microsoft.com/library/en-us/dnexcl2k2/html/odc_xlb2b.asp?frame=true Joe Futty, et al., "Using Microsoft Excel 2002 and Microsoft BizTalk Server to Build B2B Solutions" Oct. 2001, printed on Dec. 9, 2002, 13 pages.

World Wide Web, http://www.w3.org/TR/wsdl Erik Christensen, et al., "Web Services Description Language (WSDL) 1.1," Mar. 15, 2001, printed on Dec. 9, 2002, 51 pages.

World Wide Web, http://www.w3.org/TR/2002/PR-xmlenc-core-20021003/Overview.html Takeshi Imamura, et al., "XML Encryption Syntax and Processing," Oct. 3, 2002, printed on Dec. 9, 2002, 51 pages.

World Wide Web, http://www.w3.org/TR/2002/REC-xmldsig-core-20020212/Overview.html Mark Bartel, et al., "XMl-Signature Syntax and Processing," Feb. 12, 2002, printed on Dec. 9, 2002, 64 pages.

World Wide Web, http://www.w3.org/TR/2001/REC-xml-c14n-20010315 John Boyer, "Canonical XML Version 1.0" Mar. 15, 2001, printed on Dec. 9, 2002, 19 pages.

World Wide Web, http://www.w3.org/TR/SOAP/ Don Box, et al., "Simple Object Access Protocol (SOAP) 1.1" May 8, 2000, printed on Dec. 9, 2002, 35 pages.

World Wide Web, http://www.microsoft.com/biztalk/techinfo/framwork20.asp "Microsoft BizTalk Server," Apr. 18, 2001, printed on Dec. 9, 2002, 2 pages.

World Wide Web, http://www.microsoft.com/biztalk/techinfo/BizTalkFramework20.doc Microsoft BizTalk Server, "BizTalk Framework, 2.0: Document and Message Specification", Dec. 2000, 61 pages.

\* cited by examiner

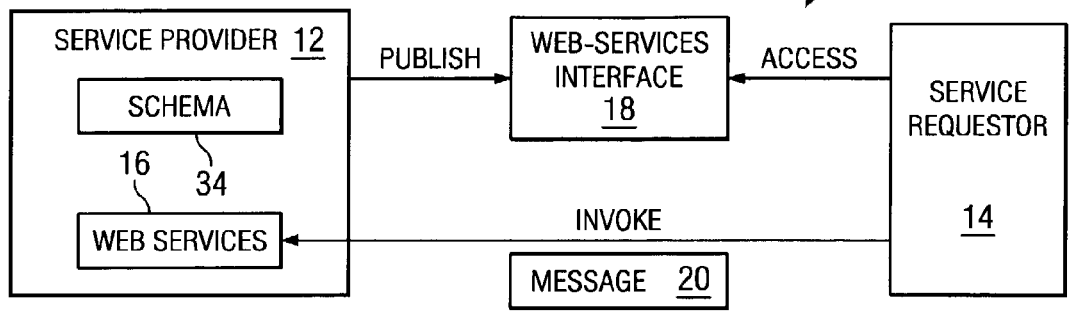
FIG. 1
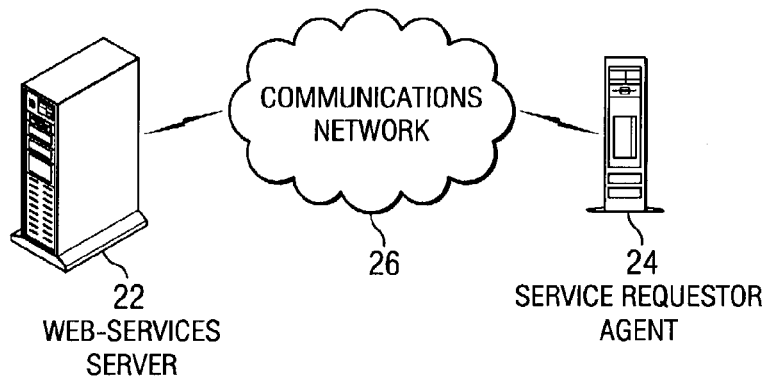
FIG. 2
FIG. 3A
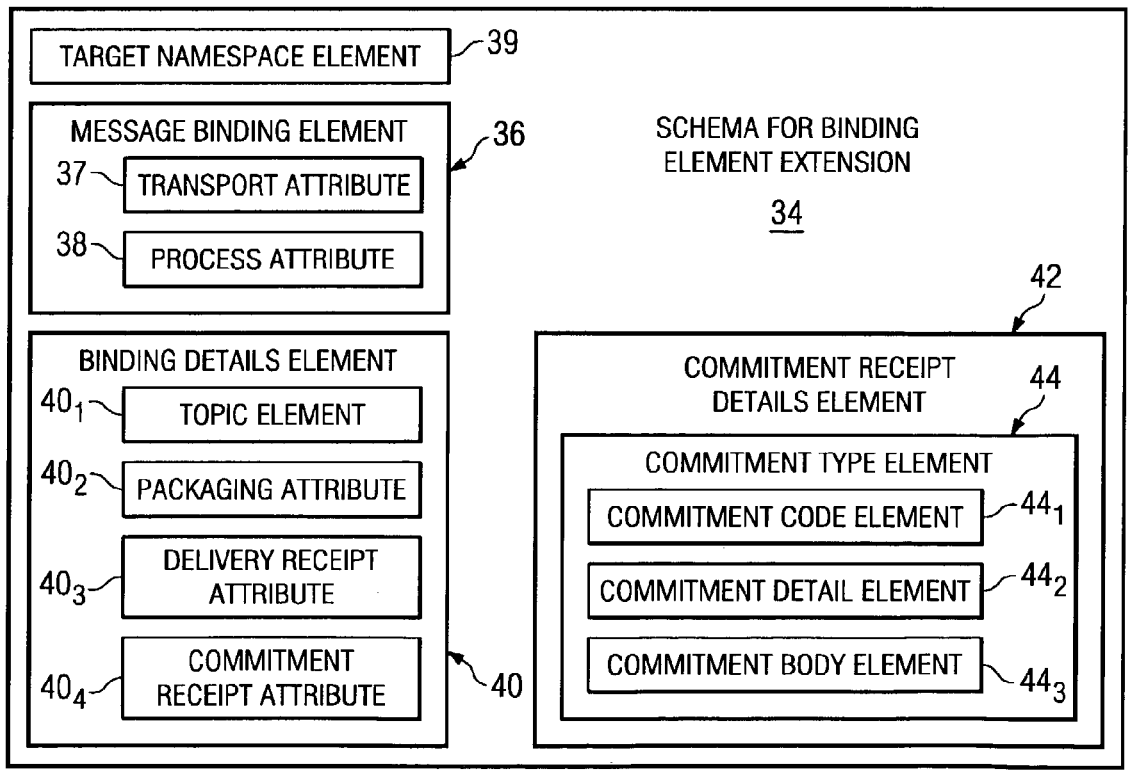

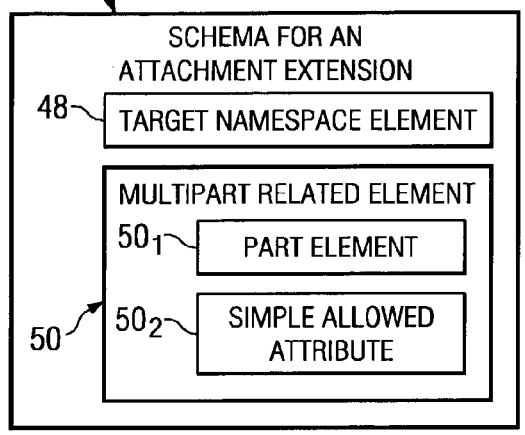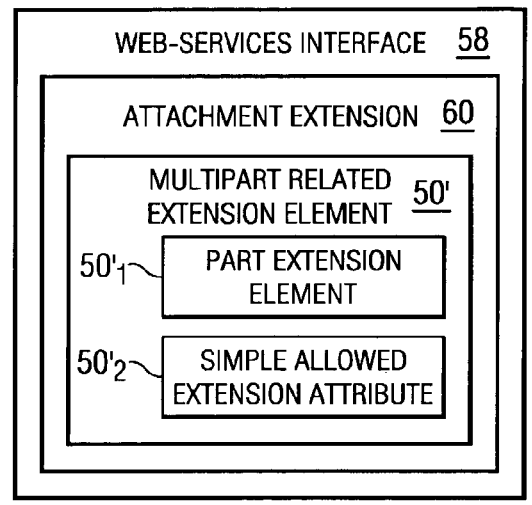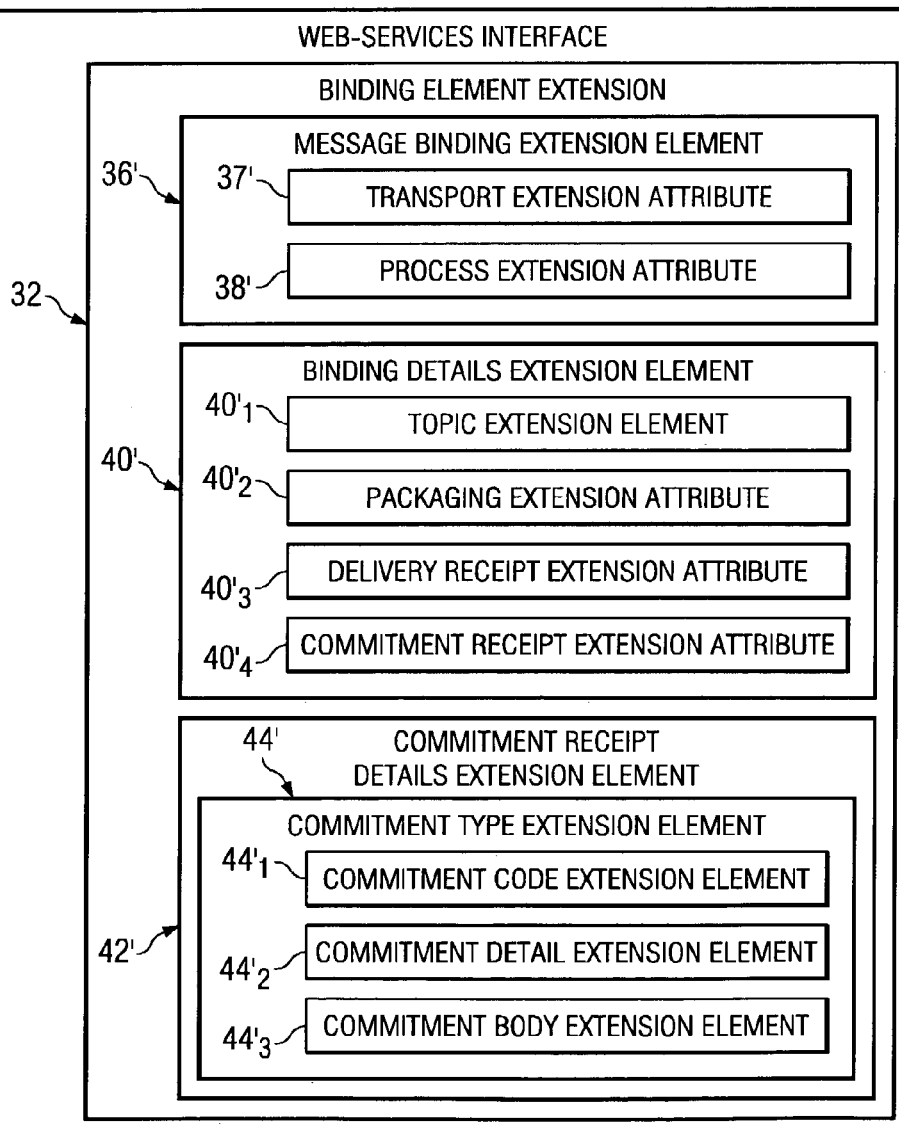

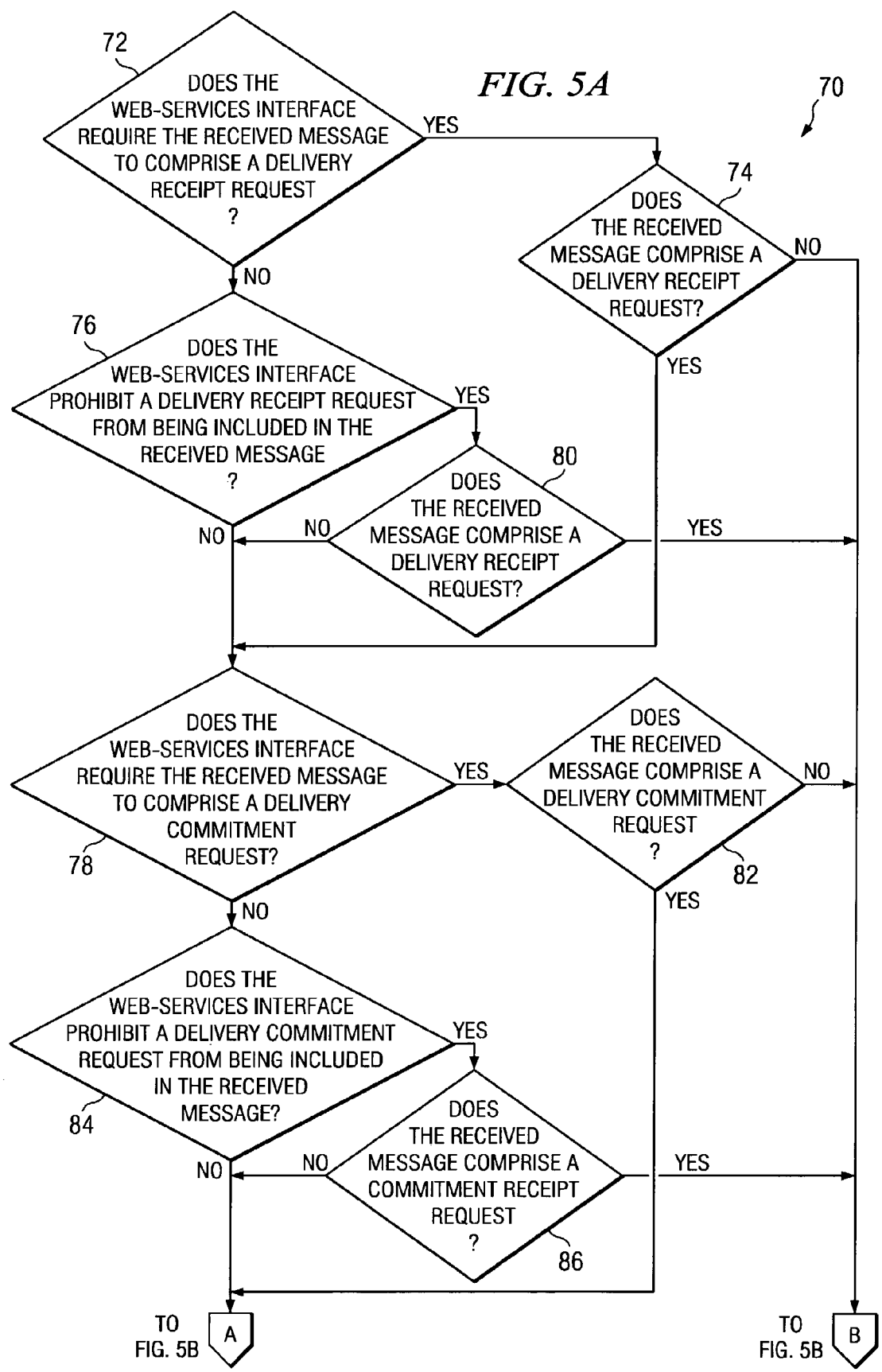

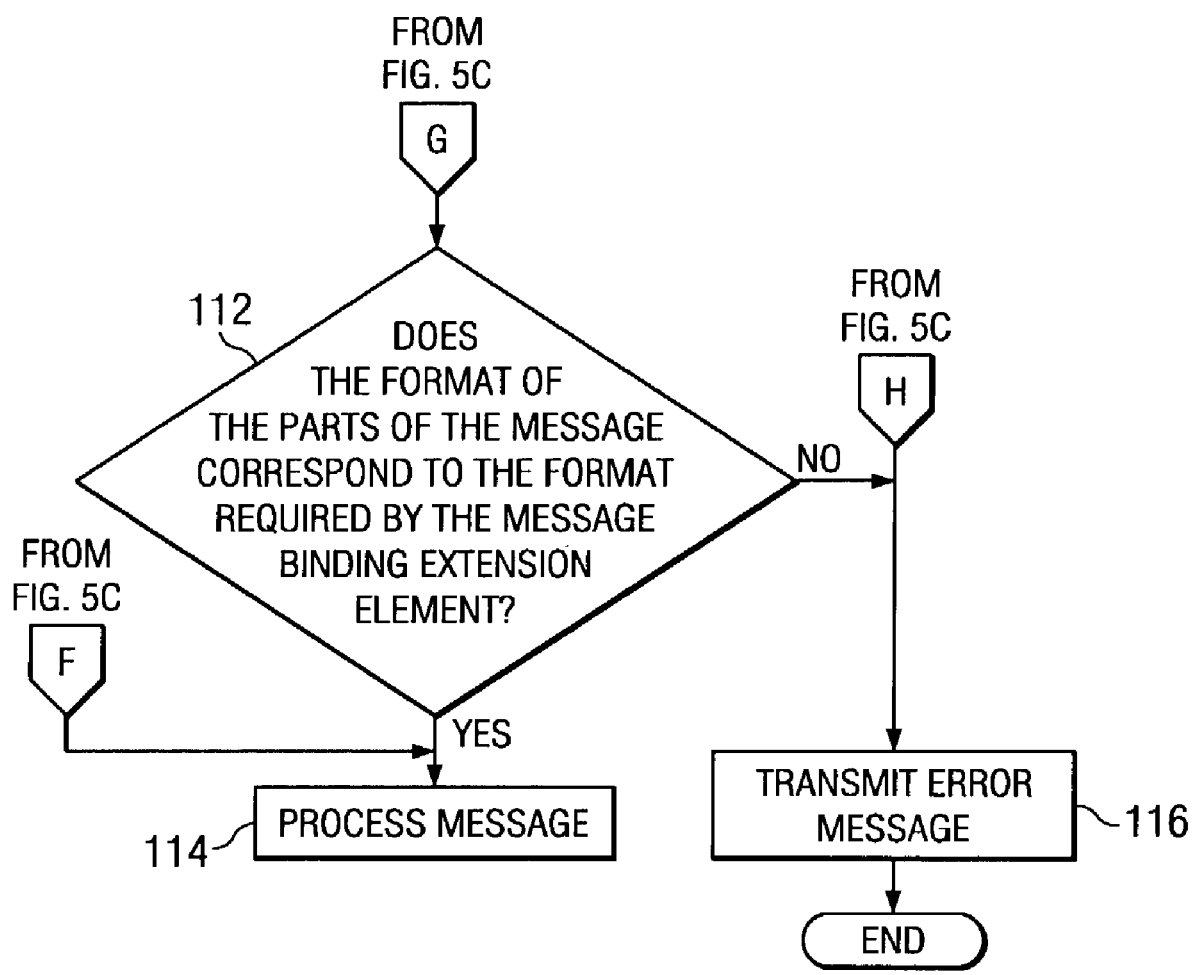

SYSTEM AND METHODS FOR DEFINING A BINDING FOR WEB-SERVICES

© Hewlett-Packard Company 2001-03. A portion of the disclosure of this patent document contains material which is subject to copyright protection. The copyright owner has no objection to the facsimile reproduction by anyone of the patent document or the patent disclosure in its entirety, as it appears in the patent and trademark office patent file or records, but otherwise reserves all copyright rights whatsoever.

TECHNICAL FIELD OF THE INVENTION

The present invention relates generally to the field of web-services, and more particularly to systems and methods for defining a binding for web-services.

BACKGROUND OF THE INVENTION

WSDL (Web Services Description Language) is a web-services description language that describes web-services by specifying parts, messages, operations, ports, port types and services. It comprises an XML (eXtensible Markup Language) vocabulary that standardizes how organizations describe web-services. A WSDL document includes various elements, which define and describe the web-services offered by the author, for example a service provider.

BizTalk Messaging Framework is a messaging framework that provides specifications for the design and development of messaging solutions for communication between applications and organizations. This specification builds upon standard and emerging Internet technologies, such as Hypertext Transfer Protocol (HTTP), Multipurpose Internet Mail Extensions (MIME), XML, and Simple Object Access Protocol (SOAP). The BizTalk Messaging Framework specifies the format of a web-services message. It defines various SOAP header elements, such as a "process" element and a "properties" element.

Service requestors can access web-services remotely across the Internet using SOAP. Using WSDL, a service provider can inform service requestors on how to request information from the service provider. Once the service requestor has access to the WSDL interface for a specific web-service, it uses SOAP messages to communicate with the service provider. Those messages may include SOAP header elements. The interaction between the service provider and the service requestor is achieved through message exchange. However, in some cases, defining what messages may be exchanged between the service provider and the service requestor may not be enough. For example, the service provider cannot specify that certain particular features of the messaging framework be always used when requesting a service.

SUMMARY OF THE INVENTION

In accordance with an embodiment of the present invention, a web-services interface for a web-service comprises a message binding extension element operable to specify a format for a message requesting the web-service and a binding details extension element operable to specify an availability status of at least one receipt for the message.

In accordance with another embodiment of the present invention, a method for defining a web-service comprises specifying a format for a message requesting the web-service and specifying an availability status of at least one receipt for the message.

BRIEF DESCRIPTION OF THE DRAWINGS

For a more complete understanding of the present invention, the objects and advantages thereof, reference is now made to the following descriptions taken in connection with the accompanying drawings in which:

FIG. 1 is a logical block diagram of a system which may use embodiments of the present invention to advantage;

FIG. 2 is a high level block diagram of a system which may use embodiments of the present invention to advantage;

FIG. 3A is a diagram of a schema for a binding element extension in accordance with an embodiment of the present invention;

FIG. 3B is a diagram of a schema for an attachment extension in accordance with an embodiment of the present invention;

FIG. 4A is a diagram of a portion of an exemplary web-services interface that comprises a binding element extension in accordance with an embodiment of the present invention;

FIG. 4B is a diagram of a portion of an exemplary web-services interface that comprises an attachment extension in accordance with an embodiment of the present invention; and FIGS. 5A-5D illustrate a flowchart of an exemplary method for processing, in accordance with an embodiment of the present invention, a message received by the service provider.

DETAILED DESCRIPTION OF THE DRAWINGS

Figure 5B:
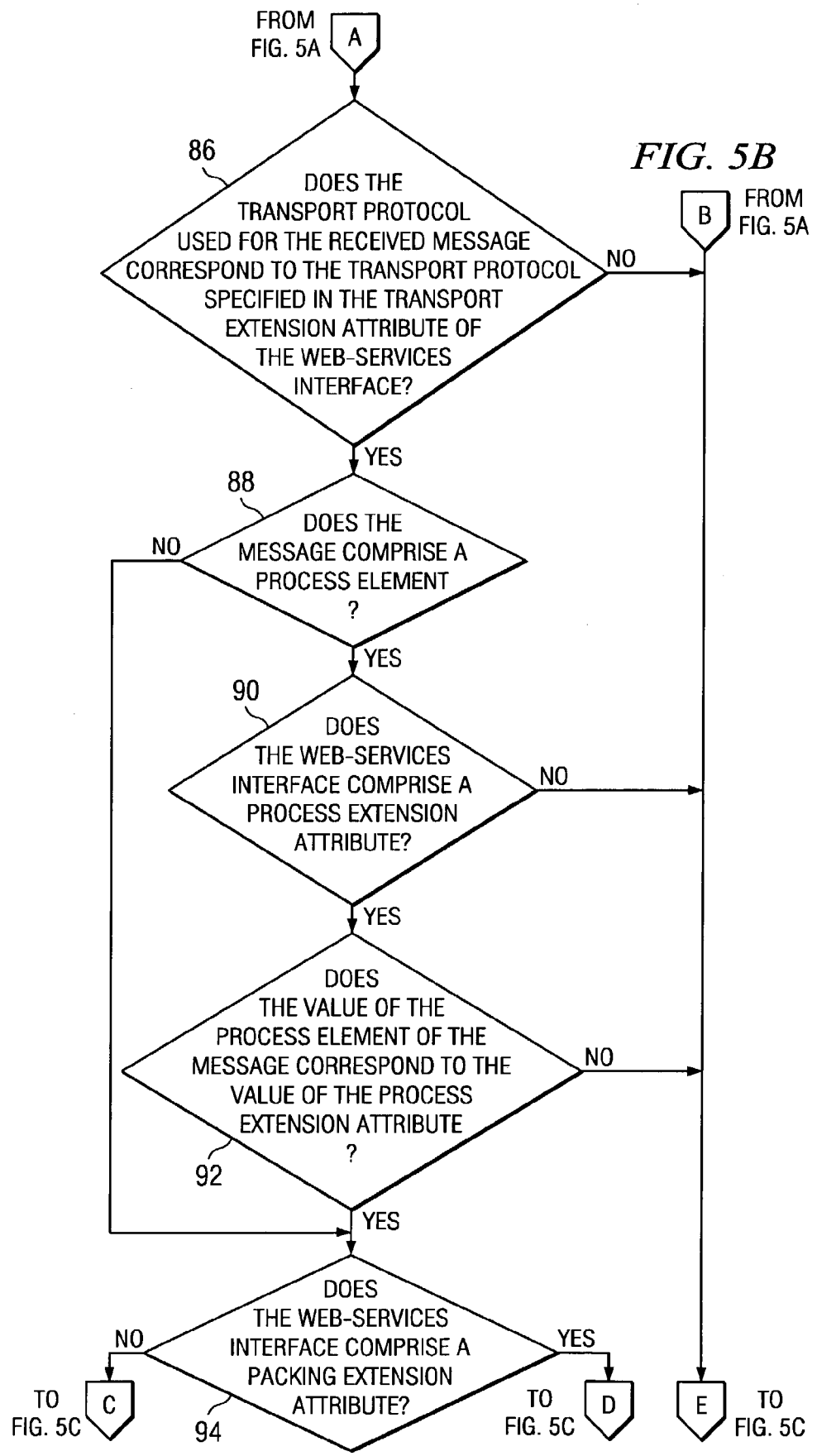
Figure 5C:
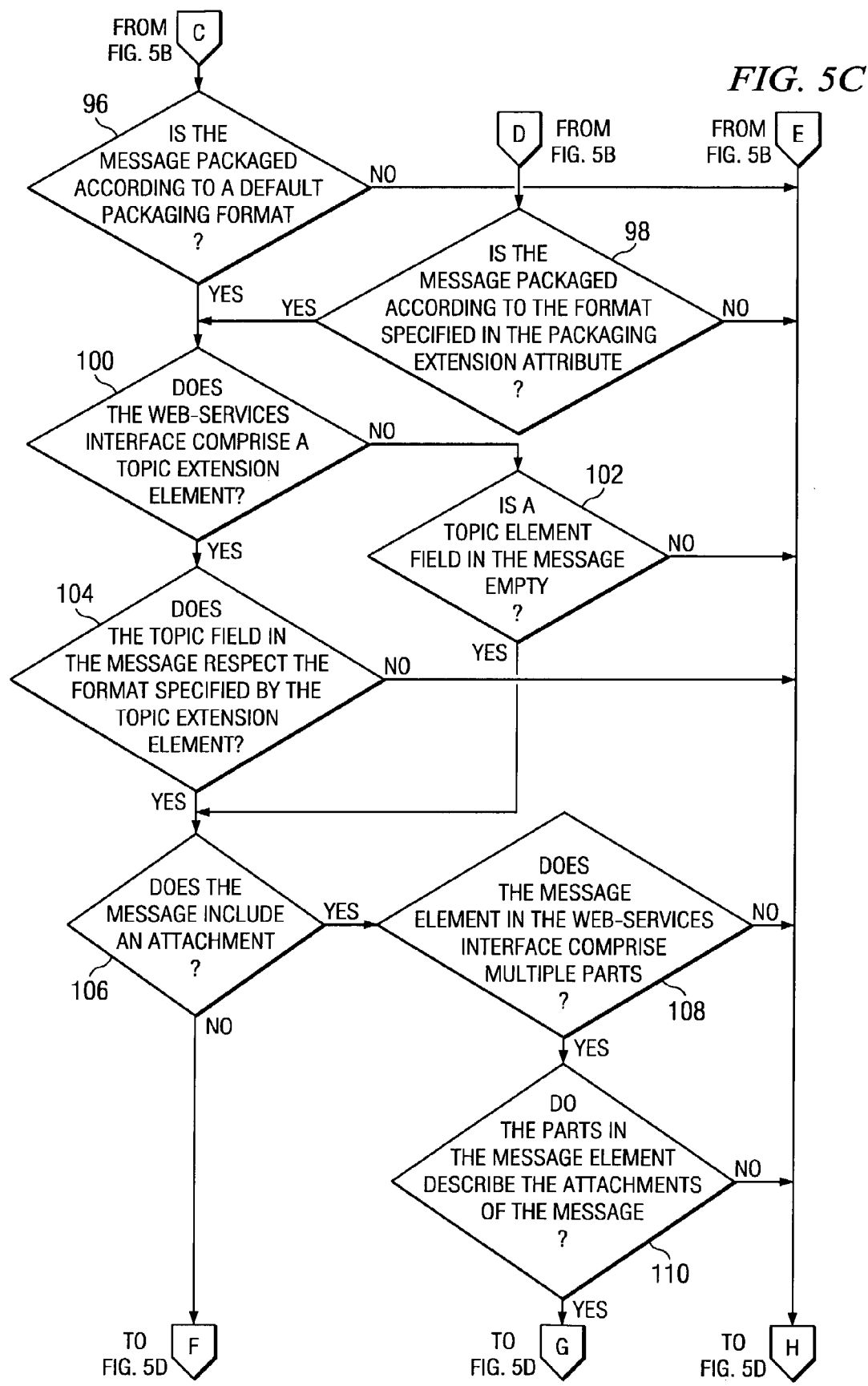

The preferred embodiment of the present invention and its advantages are best understood by referring to FIGS. 1 through 5D of the drawings, like numerals being used for like and corresponding parts of the various drawings.

A web-services interface, for example a Web Services Description Language (WSDL) document, describes at least one web-service provided by a service provider. The WSDL document may also provide information on the types of messages that may be exchanged between the service provider and a service requestor. However, WSDL does not provide a mechanism for the service provider to specify a specific message format or a specific messaging framework. Furthermore, WSDL does not provide a mechanism for the service provider to specify particular features of a specific framework, for example specific optional features that facilitate reliable messaging. In the case of business data, it is desirable that both the service provider and service requestor have confirmation of receipt of messages. Thus, there is a desire for a system and method for defining a binding for web-services messages. The binding defines or specifies the features and/or format desirable in the messages between the service provider and the service requestor.

Accordingly, a schema is provided which may be used by the service provider to define one or more web-services. The definition of the web-service preferably comprises a binding element extension, which defines or specifies the messaging features to be used in messages between the service provider and the service requestor. The messages may be web-services messages that are in accordance with an asynchronous messaging framework, such as BizTalk Messaging Framework.

Preferably, a service provider publishes a web-services interface which defines the desired messaging features. A service requestor examines the web-services interface to determine the format and/or features of the messages to be received by the service provider. Thus, for example, if the service requestor desires to receive a receipt from the service provider, then the service requestor may include a request for a receipt in the message itself in a format specified by the service provider. When a service provider receives a message, such as a web-services document or an XML (eXtensible Markup Language) document, it can determine whether the message complies with the web-services interface as defined by the service provider. If the received message complies with the defined messaging features, then the service provider processes the message appropriately. Otherwise, the service provider may ignore the received message and may transmit an error message to the service requestor.

FIG. 1 is a logical block diagram of a system 10 which may use embodiments of the present invention to advantage. System 10 comprises a service provider 12 and a service requestor 14. Service provider 12 is a provider of at least one web-service 16. Service provider 12 publishes at least one web-services interface 18 based at least in part on a schema 34 (FIG. 3A). Web-services interface 18 preferably comprises a WSDL interface, for example a WSDL document. Web-services interface 18 defines the web-services that service provider 12 is capable of providing and preferably includes a binding element extension 32 (FIG. 4A) generated in accordance with schema 34 of FIG. 3A. Web-services interface 18 may also comprise an attachment extension 60 (FIG. 4B) in accordance with schema 46 of FIG. 3B. Service requestor 14 requests one or more web-services 16 by transmitting a message 20 to service provider 12. Both service provider 12 and service requestor 14 may transmit or receive a message. Web-services interface 18 defines or specifies the messaging features for message 20. Message 20 is preferably a Simple Object Access Protocol (SOAP) document that utilizes the BizTalk Messaging Framework specification.

Referring also to FIG. 2, in an exemplary embodiment, a web-services server 22 is communicatively coupled with a service requestor agent 24. Web-services server 22 may be provided by service provider 12. Web-services server 22 is capable of providing web-services 16. Web-services server 22 may comprise a plurality of ports (not shown) corresponding to one or more operations of the web-service. Service requestor 14 utilizes service requestor agent 24 to request web-services from web-services server 22 and/or invoke operations on web-services server 22 via a communications network 26.

FIG. 3A is a diagram of a schema 34 for a binding element extension 32 in accordance with an embodiment of the present invention. FIG. 4A is a diagram of a portion of an exemplary web-services interface 18 that comprises binding element extension 32 in accordance with an embodiment of the present invention. Web-services interface 18 is an exemplary web-services interface generated by service provider 12 and made available to service requestor 14. Preferably, web-services interface 18 is a WSDL document. Binding element extension 32 complies with schema 34 of FIG. 3A. Service provider 12 defines additional information about a web-service in binding element extension 32 and informs service requestor 14 about the messaging features desired and/or supported by service provider 12. An exemplary schema is provided in APPENDIX A. A portion of exemplary web-services interface 18 in accordance with schema 34 is provided in APPENDIX B. Schema 34 comprises a plurality of elements and web-services interface 18 comprises a plurality of extension elements in accordance with schema 34. These elements are discussed in detail hereinafter.

In general, an extension element may be specified in pre-defined locations in the WSDL document, for example "binding", "binding/operation" and the sub-elements of "binding/operation". The extension elements apply to the specified element and all its sub-elements, unless a sub-element has its own details element. If a sub-element has its own details element, then the specifications of the sub-element override conflicting specifications of the parent element. For example, if details are specified at the port level, then they preferably apply to all messages and/or operations for the specified port, unless the individual messages and/or operations have conflicting details, in which case the details at the lower level override conflicting details at the higher level. An extension element may have a default details value. Thus, if the details elements are omitted, then the default values may be used, if applicable.

An element of the schema may have a documentation sub-element within an annotation element. A documentation sub-element specifies the function of the element to which it belongs in human-readable form so that an actor, for example a service provider, may understand the format in which a web-services interface conforming to the schema may be built. The example in APPENDIX A comprises the following annotation element:

```
<xsd:annotation>
    <xsd:documentation>This is a WSDL extension element
    to be used as a child
    element in definitions/binding.</xsd:documentation>
</xsd:annotation>
```

Schema 34 comprises a target namespace element 39. The following is an exemplary definition for target namespace element 39:

```
<xsd:schema targetNamespace="http://schemas.hp.com/
web-services/wsdl/biztalk"
xmlns:bt="http://schemas.hp.com/webservices/wsdl/biztalk"...>
```

Target namespace element 39 preferably defines an identifier that uniquely references an extension to a specification, for example a binding element extension to a specification of a web-services description language. An example of the identifier is a Uniform Resource Locator (URL), for example, http://schemas.hp.com/web-services/wsdl/biztalk. The identifier (not separately shown) specified in a namespace element of exemplary web-services interface 18 of FIG. 4A preferably corresponds to the identifier defined in target namespace element 39 of FIG. 3A. Target namespace element 39 also specifies that an element of a binding element extension 32 of exemplary web-services interface 18 starts with a particular string, such as "bt".

Schema 34 also comprises a message binding element 36. Message binding element 36 informs service requestor 14 about the type of messages supported by service provider 12, for example asynchronous SOAP messages with BizTalk messaging framework. The following is an exemplary definition for message binding element 36:

<xsd:element name="biztalkBinding" type="bt:biztalkBindingType">

According to the above example, message binding element 36 is of type biztalkBindingType. In the example in APPENDIX A, a message binding definition element is used to define an element of type biztalkBindingType. The following is an example of the message binding definition element:

```
<xsd:complexType name="biztalkBindingType">
    ...
    <xsd:attribute name="transport" type="bt:transportType"
    use="optional"
    default="http">
        ...
    </xsd:attribute>
    <xsd:attribute name="processExtension" type="xsd:anyURI"
    use="optional">
        ...
    </xsd:attribute>
</xsd:complexType>
```

The message binding definition element preferably provides a list of attributes which comprise message binding element 36 and which, according to schema 34, are to be defined in a message binding extension element 36' (FIG. 4A) of web-services interface 18. Message binding element 36 comprises a plurality of attributes, such as a transport attribute 37 and a process attribute 38, for example "transport" and "processExtension", as listed in the above message binding definition element. An attribute and/or element listed in the message binding definition element may be further defined. The following is an exemplary definition for transport attribute 37:

```
<xsd:attribute name="transport" type="bt:transportType" use=
"optional"
default="http">
   <xsd:annotation>
      <xsd:documentation>Specifies the transport protocol to be
      used.</xsd:documentation>
   </xsd:annotation>
</xsd:attribute>
```

According to the above example, a transport extension attribute 37' of message binding extension element 36' of web-services interface 18 of FIG. 4A preferably specifies a transport protocol to be used for messaging. The use of transport extension attribute 37' in web-services interface 18 is optional and the default value for transport attribute 37 is "http", for example. According to the above example, transport attribute 37 is of type "transportType". In the example in APPENDIX A, a transport type definition element is used to define an element of type transportType. The following is an example of a transport type definition element:

```
<xsd:simpleType name="transportType">
   <xsd:annotation>
      <xsd:documentation>Specifies a possible transport protocol.
      </xsd:documentation>
   </xsd:annotation>
   <xsd: restriction base="xsd:NMTOKEN ">
      <xsd:enumeration value="http">
         <xsd:annotation>
            <xsd:documentation>The http transport binding
            as specified in a messaging framework, such as
            BizTalk may be used.
            </xsd:documentation>
         </xsd:annotation>
      </xsd:enumeration>
      <xsd:enumeration value="smtp">
         <xsd:annotation>
            <xsd:documentation>The smtp transport binding as
            specified in a messaging framework, such as
            BizTalk may be used.
            </xsd:documentation>
         </xsd:annotation>
      </xsd:enumeration>
   </xsd:restriction>
</xsd:simpleType>
```

According to the above example, the transport type definition element specifies the possible values for transport attribute 37. The transport type definition element comprises a restriction base element of type NMTOKEN. NMTOKEN is preferably a name token comprising of one or more characters, such as alphabets, digits, hyphens, underscores and periods. The transport type definition element restricts the name tokens that may be used by defining enumeration values. In the above example, the possible enumeration values are "http" and "smtp".

Returning to FIG. 3A, the following is an exemplary definition for a process attribute 38:

```
<xsd:attribute name="processExtension" type="xsd:anyURI" use=
"optional">
   <xsd:annotation>
      <xsd:documentation>Specifies the schema to be used for the
      element header/process/detail of the header of a message.
      </xsd:documentation>
   </xsd:annotation>
</xsd:attribute>
```

According to the above example, a process extension attribute 38' of message binding extension element 36' of web-services interface 18 preferably specifies an identifier, for example a URL, that identifies the schema to be used for an element header/process/detail of a header, say a SOAP header, of message 20. According to the above example, the use of process extension attribute 38' in web-services interface 18 is optional. Process attribute 38 is of type anyURI, which indicates that any Uniform Resource Identifier (URI) for a process element extension may be specified, for example "http://schemas.hp.com/web-services/biztalk/process_WS-DLextension".

Schema 34 also comprises a binding details element 40. Message 20 may comprise a request for a receipt from the receiver of the message. The receipt may be requested by the sender of the message which may be service provider 12 and/or service requestor 14. Binding details element 40 informs service requestor 14 about the availability status of receipts, if any, for message 20 that may be requested by service provider 12 and/or service requestor 14. The following is an exemplary definition for binding details element 40:

```
<xsd:element name="biztalkBindingDetails" type=
"bt:biztalkBindingDetailsType">
   <xsd:annotation>
      <xsd:documentation>This is a WSDL extension element to
      be used as a child element in definitions/binding,
      definitions/binding/operation, definitions/binding/
      operation/input, definitions/binding/operation/
      output, and definitions/binding/operation/fault.</
      xsd:documentation>
   </xsd:annotation>
</xsd:element>
```

According to the above example, binding details element 40 is of type biztalkBindingDetailsType. In the example in APPENDIX A, a binding details definition element is used to define an element of type biztalkBindingDetailsType. The following is an example of the binding details definition element:

```
<xsd:complexType name="biztalkBindingDetailsType">
   <xsd:sequence>
      <xsd:element ref="bt:topic" minOccurs="0"/>
   </xsd:sequence>
   <xsd:attribute name="packaging" type="bt:packagingType"
   use="optional"
   default="onepart-or-multipartRelated"/>
   <xsd:attribute name="deliveryReceipt" type=
   "bt:receiptRequirementType"
   use="optional" default ="onDemand"/>
   <xsd:attribute name="commitmentReceipt" type=
   "bt:receiptRequirement Type"
   use="optional" default ="on Demand"/>
</xsd:complexType>
```

The binding definition details element preferably provides a list of elements which comprise binding details element 40 and which, according to schema 34, are to be defined in a binding details extension element 40' of web-services interface 18. If no binding details extension element 40' is specified in web-services interface 18 or if some elements, sub-elements, and/or attributes are omitted, then preferably predetermined default values, if any, apply.

Binding details element 40 comprises a plurality of elements and/or attributes, such as a topic element $40_1$, a packaging attribute $40_2$, a delivery receipt attribute $40_3$ and a commitment receipt attribute $40_4$, for example "topic", "packaging", "deliveryReceipt", and "commitmentReceipt", as listed in the above binding details definition element.

The following is an exemplary definition for topic element $40_1$:

```
<xsd:element ref="bt:topic" minOccurs="0"/>
```

According to the above example, a topic extension element $40_1$' of binding details extension element 40' of web-services interface 18 of FIG. 4A preferably specifies the content of a topic field in the header of a message, such as a SOAP header. Topic element $40_1$ has a minimum occurrence (minOccurs) value of zero, which indicates that topic extension element $40_1$' is optional in web-services interface 18. If no topic extension element $40_1$' is specified, then preferably the topic field in the message is left empty. Topic element $40_1$ references a bt:topic element. In the example in APPENDIX A, a topic definition element is used to define a bt:topic element. The following is an example of the topic definition element:

```
<xsd:element name="topic" type="bt:topicRuleType">
    <xsd:annotation>
        <xsd:documentation>Specifies how to construct the
        value for the topic field and SOAP action field of
        the Biztalkheader.</
        xsd:documentation>
    </xsd:annotation>
</xsd:element>
```

According to the above example, the topic definition element specifies how to construct the value for topic extension element $40_1$' of a message. The bt:topic element is of type topicRuleType. In the example in APPENDIX A, a topic rule type definition element is used to define an element of type topicRuleType. The following is an example of the topic rule type definition element:

```
<xsd:complexType name="topicRuleType">
    <xsd:choice>
        <xsd:element name="string" type="xsd:string">
            <xsd:annotation>
                <xsd:documentation>Specifies the exact string to be inserted
                in the topic field.<xsd:documentation>
            </xsd:annotation>
        </xsd:element>
        <xsd:element name="schema" type="xsd:anyType">
            <xsd:annotation>
                <xsd:documentation>Provides a schema for the XML segment
                to be inserted as a string in the topic field.</xsd:documentation>
            </xsd:annotation>
        </xsd:element>
        <xsd:element name="XSL" type=" xsd:anyType">
```

-continued

```
            <xsd:annotation>
                <xsd:documentation>Provides a rule on how to construct the
                string for the topic field using XSL. </xsd:documentation>
            </xsd:annotation>
        </xsd:element>
    </xsd:choice>
</xsd:complexType>
```

According to the above example, the topic rule type definition element comprises a choice element. The choice element provides a choice to service provider 12 in how to specify the value for topic extension element $40_1$'. According to the above example, service provider 12 may specify the value for topic extension element $40_1$' in one of three ways. The first element string is of type string, which specifies the exact string that is provided in topic extension element $40_1$'. The second element schema is of type anyType, which provides a schema for a segment, for example an XML segment, that is inserted as a string in topic extension element $40_1$'. The third element XSL is of type anyType, which provides a rule on how to construct the string for the topic field using an XSL (eXtensible Stylesheet Language) expression.

The following is an exemplary definition for packaging attribute $40_2$:

```
<xsd:attribute name=" packaging" type="bt:packagingType"
use="optional" default="onepart-or-multipartRelated"/>
```

According to the above example, a packaging extension attribute $40_2$' of binding details extension element 40' of web-services interface 18 preferably specifies how the messages are packaged, for example as SOAP messages with MIME-multipart structure (multipartRelated), simple SOAP messages without any MIME-multipart structure (onepart), and/or the like. If desired, the sender may be given the option to decide which format to use (onepart-or-multipartRelated). Packaging extension attribute $40_2$' is optional in web-services interface 18. If no packaging extension attribute $40_2$' is specified, then a default value is used. In the example in APPENDIX A, the default value is onepart-or-multipartRelated. Packaging attribute $40_2$ is of type packagingType. In the example in APPENDIX A, a packaging type definition element is used to define an attribute of type packagingType. The following is an example of the packaging type definition element:

```
<xsd:simpleType name="packagingType">
    <xsd:restriction base="xsd:NMTOKEN">
        <xsd:enumeration value="onepart-or-multipartRelated">
            <xsd:annotation>
                <xsd:documentation>The sender of the message may determine
                if the message gets packaged as a simple SOAP message or into
                a MIME-multipart message.</xsd:documentation>
            </xsd:annotation>
        </xsd:enumeration>
        <xsd:enumeration value="onepart"/>
        <xsd:enumeration value="multipartRelated"/>
    </xsd:restriction>
</xsd:simpleType>
```

According to the above example, the packaging type definition element specifies the possible values for packaging attribute $40_2$. The packaging type definition element comprises of a restriction base element of type NMTOKEN. The packaging type definition element restricts the name tokens that may be used by defining enumeration values. In the above example, the possible enumeration values are "onepart", "multipartRelated" and "onepart-or-multipartRelated".

The following is an exemplary definition for delivery receipt attribute $40_3$:

```
<xsd:attribute name="deliveryReceipt" type="bt:receiptRequirementType"
use="optional" default="onDemand"/>
```

According to the above example, a delivery receipt extension attribute $40_3'$ of web-services interface 18 preferably specifies if a delivery receipt is desirable. For example a messaging framework, such as the BizTalk Messaging Framework may provide for a delivery receipt, such as deliveryReceipt, that may be sent to the sender of the message indicating that the message has been received and accepted. Delivery receipt attribute $40_3$ is of type receiptRequirementType. In the example in APPENDIX A, a receipt requirement type definition element is used to define an element of type receiptRequirementType. Delivery receipt extension attribute $40_3'$ is optional in web-services interface 18. If no delivery receipt extension attribute $40_3'$ is specified, then a default value is used. In the example in APPENDIX A, the default value is onDemand.

The following is an exemplary definition for commitment receipt attribute $40_4$:

```
<xsd:attribute name="commitmentReceipt"
   type="bt:receiptRequirementType"
   use="optional" default="on Demand"/>
```

According to the above example, a commitment receipt extension attribute $40_4'$ of web-services interface 18 preferably specifies if a commitment receipt is desirable. For example a messaging framework, such as the BizTalk Messaging Framework may provide for a commitment receipt, such as commitmentReceipt, that may be sent by the recipient of the message to the sender of the message indicating that the message has been inspected for correctness of content and committed for processing. Commitment receipt attribute $40_4$ is of type receiptRequirementType. In the example in APPENDIX A, a receipt requirement type definition element is used to define an element of type receiptRequirementType. Commitment receipt extension attribute $40_4'$ is optional in web-services interface 18. If no commitment receipt extension attribute $40_4'$ is specified, then a default value is used. In the example in APPENDIX A, the default value is onDemand.

The receipt requirement type definition element specifies the possible values for attributes, such as the delivery receipt attribute $40_3$ and commitment receipt attribute $40_4$. The following is an example of the receipt requirement type definition element:

```
<xsd:simpleType name=" receiptRequirementType">
   <xsd:restriction base="xsd:NMTOKEN">
      <xsd:enumeration value="onDemand">
         <xsd:annotation>
            <xsd:documentation>It is up to the sender of the original
            message if the sender wants a receipt or
            not.</xsd:documentation>
```

-continued

```
         </xsd:annotation>
      </xsd:enumeration>
      <xsd:enumeration value="none">
         <xsd:annotation>
            <xsd:documentation>Receipt is not allowed and none may be
            requested.</xsd:documentation>
         </xsd:annotation>
      </xsd:enumeration>
      <xsd:enumeration value=" required">
         <xsd:annotation>
            <xsd:documentation>Receipt must be requested by the
            message.</xsd:documentation>
         </xsd:annotation>
      </xsd:enumeration>
   </xsd:restriction>
</xsd:simpleType>
```

According to the above example, the receipt requirement type definition element comprises a restriction base element of type NMTOKEN. The receipt requirement type definition element restricts the name tokens that may be used by defining enumeration values. Possible enumeration values are "onDemand", "none", and "required". A value of "onDemand" indicates that it is up to the sender of the message to decide if the sender wants a receipt or not. This choice is expressed by including a receipt request header in the message. The receipt request header may be in a format specified by a messaging framework, such as the BizTalk messaging framework. A value of "none" indicates that a receipt is not allowed and may not be requested. A value of "required" indicates that a receipt must be requested by the message.

Schema 34 comprises a commitment receipt details element 42. A commitment receipt may have application specific content. The commitment receipt may comprise of a commitment header and a commitment body. A commitment receipt details extension element 42' of web-services interface 18 specifies elements or data types that may be used for the application specific content and provides information for the commitment header and the commitment body of the commitment receipt. If no element and/or attribute of commitment receipt details extension element 42' is specified in web-services interface 18, then the corresponding fields of the commitment receipt are left empty. The following is an exemplary definition for commitment receipt details element 42:

```
<xsd:element name="commitmentReceiptDetails"
type="bt:commitmentReceiptDetailsType">
   <xsd:annotation>
      <xsd:documentation>Provides the details for the header and body of a
      commitment message. If part or all of the description is omitted, the
      respective fields in the commitment message are
      empty.</xsd:documentation>
   </xsd:annotation>
</xsd:element>
```

According to the above example, commitment receipt details element 42 is of type commitmentReceiptDetailsType. In the example in APPENDIX A, a commitment receipt details type definition element is used to define an element of type commitmentReceiptDetailsType. The following is an example of the commitment receipt details type definition element:

```
<xsd:complexType name="commitmentReceiptDetailsType">
    <xsd:sequence>
        <xsd:element name="commitmentType" maxOccurs="unbounded">
            <xsd:annotation>
                <xsd:documentation>Allows to specify a list of
                commitmentCodes and the commitmentDetail and
                commitmentBody content associated
                with it.</xsd:documentation>
            </xsd:annotation>
            ...
        </xsd:element>
    </xsd:sequence>
</xsd:complexType>
```

The commitment receipt details type definition element preferably provides a list of elements which comprise commitment receipt details element 42 and which, according to schema 34, are to be defined in a commitment receipt details extension element 42' of web-services interface 18. Commitment receipt details element 42 comprises a commitment type element 44, for example "commitmentType". According to the above example, commitment type element 44 has a maximum occurrence value of "unbounded" which indicates that a commitment type extension element 44' may appear one or more times in commitment receipt details extension element 42'. Commitment type extension element 44' specifies the details for a specific commitment code. The following is an exemplary definition for commitment type element 44:

```
<xsd:complexType>
    <xsd:sequence>
        <xsd:element name="commitmentCode"
        type="bt:commitmentCodeType">
            ...
        </xsd:element>
        <xsd:element name="commitmentDetail"
        type="bt:commitmentDetailType"
        minOccurs="0">
            ...
        </xsd:element>
        <xsd:element name="commitmentBody"
        type="bt:commitmentBodyType"
        minOccurs="0">
            ...
        </xsd:element>
    </xsd:sequence>
</xsd:complexType>
```

According to the above example, commitment type element 44 comprises a plurality of elements, such as a commitment code element $44_1$, a commitment detail element $44_2$ and a commitment body element $44_3$, for example "commitmentCode", "commitmentDetail", and "commitmentBody". The following is an exemplary definition for commitment code element $44_1$:

```
<xsd:element name="commitmentCode" type="bt.commitmentCodeType">
    <xsd:annotation>
        <xsd:documentation>Specifies the value or a list of possible values of the
        element commitmentCode associated with the header of a commitment
        receipt.</xsd:documentation>
    </xsd:annotation>
</xsd:element>
```

According to the above example, a commitment code extension element $44_1$' of commitment type extension element 44' of web-services interface 18 of FIG. 4A preferably specifies one or more permissible values for the commitment code for the particular web-service defined. Commit code element $44_1$ is of type commitmentCodeType. In the example in APPENDIX A, a commitment code type definition element is used to define an element of type commitmentCodeType. The following is an example of the commitment code type definition element:

```
<xsd:complexType name= "commitmentCodeType">
    <xsd:sequence>
        <xsd:element name="codeValue" type="xsd:QName"
        minOccurs="0" maxOccurs="unbounded"/>
    </xsd:sequence>
</xsd:complexType>
```

According to the above example, the commitment code type definition element comprises of a code value element of type QName. In general, QName stands for qualified name and is preferably composed of a prefix followed by a colon (":") and a name. The prefix and the name after the colon are preferably of type NCName. NCName stands for non-colon name which comprises of one or more characters, such as alphabets, digits, hyphens, underscores and/or periods. It may start with an alphabet or an underscore. Preferably, NCName does not comprise a colon.

A code value element has a minimum occurrence value (minOccurs) of zero and a maximum occurrence (maxOccurs) value of "unbounded", which indicates that commitment type extension element 44' of web-services interface 18 may comprise of one or more commitment code extension elements $44_1$'.

The following is an exemplary definition for commitment detail element $44_2$:

```
<xsd:element name="commitmentDetail"
type="bt:commitmentDetailType"
minOccurs="0">
    <xsd:annotation>
        <xsd:documentation>Specifies the content of the commitment detail
        element in the header of the commitment
        receipt.</xsd:documentation>
    </xsd:annotation>
</xsd:element>
```

According to the above example, a commitment detail extension element $44_2$' of commitment type extension element 44' of web-services interface 18 preferably specifies the content of the commitment details element in the header of the commitment receipt. It specifies the application specific sub-elements of the commitment detail element. Commitment detail element $44_2$ has a minimum occurrence (minOccurs) value of zero, which indicates that commitment detail extension element $44_2'$ is optional in web-services interface 18. Commitment detail element $44_2$ is of type commitmentDetailType. In the example in APPENDIX A, a commitment detail type definition element is used to define an element of type commitmentDetailType. The following is an example of the commitment detail type definition element:

```
<xsd:complexType name="commitmentDetailType">
   <xsd:sequence>
      <xsd:element name=" messageDigest" minOccurs="0">
         ...
      </xsd:element>
   </xsd:sequence>
   <xsd:attribute name="digestRequired" type="xsd:boolean"
   use="optional" default="false">
      ...
   </xsd:attribute>
   <xsd:attribute name=" message" type="xsd:QName" use="optional/>
      ...
   </xsd:attribute>
   <xsd:attribute name="parts" type="xsd:NMTOKENS" use="optional">
      ...
   </xsd:attribute>
</xsd:complexType>
```

According to the above example, the commitment detail type definition element comprises of a message digest element, a digest required attribute, a commitment details type message attribute and a commitment details type parts attribute. The following is an exemplary definition for the message digest element:

```
<xsd:element name=" messageDigest" minOccurs="0">
   <xsd:annotation>
      <xsd:documentation>Provides details regarding the algorithms that
      may be used for calculating a digest.</xsd:documentation>
   </xsd:annotation>
   <xsd:complexType>
      <xsd:sequence>
         <xsd:element name="digestMethod" type="xsd:anyURI"
         default="http://www.w3.org/2000/09/xmldsig#sha1"
         minOccurs="0" maxOccurs="unbounded"/>
         <xsd:element name="canonicalizationMethod" type="xsd:anyURI"
         default="http://www.w3.org/TR/2001/REC-xml-c14n-20010315"
         minOccurs="0" maxOccurs="unbounded"/>
      </xsd:sequence>
   </xsd:complexType>
</xsd:element>
```

According to the above example, the message digest element provides details regarding the algorithms that may be used for calculating a digest. In general, a digest algorithm may be used to create a string which represents the message being sent to either service provider 12 or service requestor 14. The string may then be used to determine whether the message has been changed or not. The message digest element has a minimum occurrence value (minOccurs) of zero, which indicates that this element is optional in commitment detail extension element $44_2'$. The message digest element comprises of a digest method element and a canonicalization method element.

The digest method element is of type anyURI, which indicates that any URI referencing a digest algorithm may be specified. The digest method element may have a default value, for example, http://www.w3.org/2000/09/xmldsig#sha1. The digest method element has a minimum occurrence (minOccurs) value of zero and a maximum occurrence (maxOccurs) value of "unbounded", which indicates that the digest method element may appear zero or more times.

The canonicalization method element specifies a canonicalization algorithm. In general, a canonicalization algorithm comprises an algorithm to standardize the XML representation of an object such that two semantically equivalent objects have the same XML representation. The canonicalization method element is of type anyURI, which indicates that any URI referencing a canonicalization algorithm may be specified. The canonicalization method element may have a default value, for example, http://www.w3.org/TR/2001/REC-xml-c14n-20010315. The canonicalization method element has a minimum occurrence (minOccurs) value of zero and a maximum occurrence (maxOccurs) value of "unbounded", which indicates that the canonicalization method element may appear zero or more times.

The following is an exemplary definition for the digest required attribute:

```
<xsd:attribute name="digestRequired" type="xsd:boolean" use="optional"
default="false">
   <xsd:annotation>
      <xsd:documentation>Specifies whether the commitmentCode
      element has a digest subelement that contains the digest of a
      message being acknowledged.</xsd:documentation>
   </xsd:annotation>
</xsd:attribute>
```

According to the above example, the digest required attribute specifies whether the commitment code element has a digest sub-element that contains the digest of a message, such as a BizTalk message, being acknowledged. The digest required attribute is of type boolean and may have values of true or false. The use of the digest required attribute is optional and the default value is false.

The following is an exemplary definition for the commitment details type message attribute:

```
<xsd:attribute name=" message" type="xsd:QName" use="optional/>
   <xsd:annotation>
      <xsd:documentation>References a message defined in the web-
      services interface and points to the XML elements and/or data types
      that may be used in the commitment detail header
      element.</xsd:documentation>
   </xsd:annotation>
</xsd:attribute>
```

According to the above example, the commitment details type message attribute references a message defined in the web-services interface. It points to the XML elements and/or data types that may be used in the commitment detail header element. The commitment details type message attribute is of type QName and the use of the commitment details type message attribute is optional.

The following is an exemplary definition for the commitment details type parts attribute:

```
<xsd:attribute name="parts" type="xsd:NMTOKENS" use="optional">
   <xsd:annotation>
      <xsd:documentation>Provides a list of the parts used from a
      message and points to the XML elements or data types that can be
      used in the commitment detail header element.</xsd:documentation>
   </xsd:annotation>
</xsd:attribute>
```

According to the above example, the commitment details type parts attribute provides a list of parts of the message, referenced by the commitment details type message attribute, that preferably appear within the commitment detail element of the commitment receipt. It points to the XML elements and/or data types of a message that may be used in the commitment detail header element. The commitment details type parts attribute is of type NMTOKENS and the use of the commitment details type parts attribute is optional.

The following is an exemplary definition for commitment body element $44_3$:

```
<xsd:element name="commitmentBody" type="bt:commitmentBodyType"
   minOccurs="0">
   <xsd:annotation>
      <xsd:documentation>Specifies the content of the SOAP body of the
         commitment receipt.</xsd:documentation>
   </xsd:annotation>
</xsd:element>
```

According to the above example, a commitment body extension element $44_3$' of commitment type extension element 44' of web-services interface 18 preferably specifies the content, for example the application specific content, of the body of the commitment receipt. Commitment body element $44_3$ has a minimum occurrence (minOccurs) value of zero, which indicates that commitment body extension element $44_3$' is optional in web-services interface 18. Commitment body element $44_3$ is of type commitmentBodyType. In the example in APPENDIX A, a commitment body type definition element is used to define an element of type commitmentBodyType. The following is an example of the commitment body type definition element:

```
<xsd:complexType name="commitmentBodyType">
   <xsd:attribute name="message" type="xsd:QName" use="required"/>
   <xsd:attribute name="parts" type="xsd:NMTOKENS" use="required"/>
   <xsd:attribute name="use" type="bt:useChoice" use="required"/>
   <xsd:attribute name= "encodingStyle" type="xsd:anyURI"
      use="optional"/>
   <xsd:attribute name=" namespace" type="xsd:anyURI"
      use="optional"/>
</xsd:complexType>
```

According to the above example, the commitment body type definition element comprises of a commitment body type message attribute, a commitment body type parts attribute, a use attribute, an encoding style attribute and a namespace attribute. The commitment body type message attribute references a message defined in the web-services interface. The commitment body type message attribute is of type QName and the use of the message attribute is required.

The commitment body type parts attribute provides a list of parts of the message, referenced by the commitment body type message attribute, that preferably appear within the commitment detail element of the commitment receipt. The commitment body type parts attribute is of type NMTOKENS and the use of the commitment body type parts attribute is required.

According to the above example, the use attribute is of type useChoice. The use attribute specifies the type of encoding used to create commitment body extension element $44_3$'. In APPENDIX A, a use type definition element is used to define an element of type useChoice. The following is an example of the use choice definition element:

```
<xsd:simpleType name=" useChoice">
   <xsd:annotation>
      <xsd:documentation>Corresponds to the WSDL SOAP binding
         useChoice type.</xsd:documentation>
   </xsd:annotation>
   <xsd:restriction base=" xsd:string">
      <xsd:enumeration value="literal"/>
      <xsd:enumeration value="encoded"/>
   </xsd:restriction>
</xsd:simpleType>
```

According to the above example, the use choice definition element comprises a restriction base element of type string. The use choice definition element restricts the strings that may be used by defining enumeration values. The possible enumeration values are "literal" and "encoded". A value of "literal" for the use attribute indicates that a concrete schema for the parts in the commitment detail extension element $44_2$' should be provided and the commitment receipt should follow the specified schema. A value of "encoded" for the use attribute indicates that rules are used for encoding and the sender of the commitment receipt should obey the encoded rules.

The encoding style attribute provides indication of the rules to follow for encoding. The encoding style attribute is of type anyURI, which indicates that any URI referencing an encoding style may be specified. The use of the encoding style attribute is optional. The namespace attribute provides an input for the encoding. The namespace attribute is of type anyURI, which indicates that any URI may be specified. The use of the namespace attribute is optional.

In general, a web-services message, such as message 20, may have attachments. Certain predefined extensions, for example those specified in WSDL specification 1.1, may be used in combination with binding element extension 32 to facilitate binding of messages with attachments.

FIG. 3B is a diagram of a schema 46 for attachment extension 60 in accordance with an embodiment of the present invention. FIG. 4B is a diagram of a portion of an exemplary web-services interface 58 that comprises attachment extension 60. If desired, at least a portion of web-services interface 58 may be part of web-services interface 18 of FIG. 4A or at least a portion of web-services interface 18 may be part of web-services interface 58. Attachment extension 60 complies with schema 46 of FIG. 3B. Service provider 12 defines additional information about an attachment to a message in attachment extension 60.

An exemplary schema for attachment extension 60 is provided in APPENDIX C. A portion of an exemplary web-services interface in accordance with schema 46 is provided in APPENDIX D. Schema 46 comprises of a plurality of elements. These elements are discussed in detail hereinafter. Schema 46 is used by service provider 12 to create web-services interface 58 defining attachments to a message. An attachment extension in accordance with schema 46 may be specified in predefined locations in the WSDL document, for example "binding/operation/output", "binding/operation/input", and "binding/operation/fault".

Schema 46 comprises a target namespace element 48. The following is an exemplary definition for target namespace element 48:

<xsd:schema targetNamespace="http://schemas.hp.com/ web-services/wsdl/enhanced-mime"xmlns:enhanced-mime="http://schemas.hp.com/web-services/wsdl/enhanced-mime" . . . >

Target namespace element 48 preferably defines an identifier, that uniquely references an extension to a specification, for example an attachment extension to a specification of a web-services description language. An example of such as identifier is a URL, for example http://schemas.hp.com/web-services/wsdl/enhanced-mime. The identifier specified in a namespace element (not shown) of exemplary web-services interface 58 of FIG. 4B preferably corresponds to the identifier defined in target namespace element 48.

A portion, for example xmlns:enhanced-mime="http://schemas.hp.com/web-services/wsdl/enhanced-mime", of target namespace element 48 specifies that an element of an attachment extension 60 of exemplary web-services interface 58 starts with the string enhanced-mime although it may also include elements that start with the string mime.

Schema 46 also comprises a multipart related element 50. The following is an exemplary definition for multipart related element 50:

```
<xsd:element name=" multipartRelated"
    type="enhanced-mime:multipartRelatedType"/>
```

According to the above example, multipart related element 50 is of type multipartRelatedType and specifies the elements and/or attributes defined by service provider 12 in a multipart related extension element 50' of web-services interface 58. In the example in APPENDIX C, a multipart related type definition element is used to define an element of type multipartRelatedType. The following is an example of the multipart related type definition element:

```
<xsd:complexType name=" multipartRelatedType">
    <xsd:choice>
        <xsd:element ref="enhanced-mime: part" minOccurs="0"
            maxOccurs="unbounded"/>
        <xsd:element ref="mime.part" minOccurs="0"
            maxOccurs="unbounded"/>
    </xsd:choice>
    <xsd:attribute name="simpleAllowed" type="xsd:boolean"
    default="false"/>
</xsd:complexType>
```

According to the above example, the multipart related type definition element comprises of a choice element. The choice element provides a choice to service provider 12 in how to define a part extension element 50₁' of multipart related extension element 50'. According to the above example, service provider 12 may define part extension element 50₁' in one of two ways. The first method references an element of type enhanced-mime:part, which is described in detail hereinbelow. Because the minimum occurrence value is zero and the maximum occurrence value is "unbounded", using this method, service provider 12 may specify part extension element 50₁' zero or more times. Thus, the message may optionally have attachments and/or may also have more than one attachment.

A second method for defining part extension element 50₁' is of type mime:part. This method specifies that an existing method for specifying attachments may be used, for example a method as provided by a MIME binding of the WSDL specification as specified at http://www.oac.uci.edu/indiv/ehood/MIME/MIME.html. The multipart related type definition element also comprises a simple allowed attribute 50₂. According to the above definition, a simple allowed extension attribute 50₂' of multipart related extension element 50' is of type boolean. The default value of simple allowed extension attribute is "false". Simple allowed extension attribute 50₂' indicates whether a message uses a MIME multipart binding even when there are no attachments. A value of "false" for simple allowed extension attribute 50₂' signifies that even if there are no attachments, preferably MIME multipart binding is used.

The following is an exemplary definition for an element of type

```
enhanced-mime:part:
    <xsd:element name="part" type="enhanced-mime: part Type"/>
```

According to the above example, this element is of type partType. The following is a definition of an element of type partType:

```
<xsd:complexType name="partType">
    <xsd:sequence>
        <xsd:any namespace="targetNamespace" minOccurs="0"
            maxOccurs="unbounded"/>
    </xsd:sequence>
    <xsd:attribute name=" minOccurs" type="xsd:nonNegativeInteger"
        use="optional" default="1"/>
    <xsd:attribute name=" maxOccurs" use="optional" default="1">
    ...
    </xsd:attribute>
</xsd:complexType>
```

According to the above example, an element of type partType comprises of a target namespace element (not shown) with a minimum occurrence value of zero and a maximum occurrence value of "unbounded", which indicates that this element is optional and may appear zero or more times. An element of type partType may also comprise a minimum occurrence attribute of type nonNegativeInteger. The use of the minimum occurrence attribute is optional and the default value is one. An element of type partType may also comprise a maximum occurrence attribute of type allNNI. The use of the maximum occurrence attribute is optional and the default value is one. The following is an exemplary definition for an element of type allNNI:

```
<xsd:simpleType name="allNNI">
    <xsd:union memberTypes="xsd:nonNegativeInteger">
        <xsd:simpleType>
            <xsd:restriction base="xsd:NMTOKEN">
                <xsd:enumeration value="unbounded"/>
            </xsd:restriction>
        </xsd:simpleType>
    </xsd:union>
</xsd:simpleType>
```

According to the above definition, an element of type allNNI is a union between a simpleType element as defined above and a schema of type nonNegativeInteger which is defined as any non-negative integer. The value of the maximum occurrence attribute is limited to a non-negative integer with a restriction base of type NMTOKEN. However, the restriction base is further limited to a value of "unbounded".

In accordance with an embodiment of the present invention, binding element extension 32 preferably comprises a plurality of elements. Preferably, binding element extension 32 comprises of the elements specified by schema 34 (of FIG.

3A), such as a message binding extension element 36', a binding details extension element 40', and a commitment receipt details extension element 42', for example "biztalk-Binding", "biztalkBindingDetails" and "commitmentReceiptDetails". The following is an example of binding element extension 32:

```
<bt:biztalkBinding transport="http"
      processExtension="http://schemas.hp.com/web-services/biztalk/
      process_WSDLextension"
      xmls:bt="http://schemas.hp.com/web-services/wsdl/biztalk"/>
<bt:biztalkBindingDetails packaging="onepart-or-multipartRelated"
      deliveryReceipt="required" commitmentReceipt="onDemand" />
<bt:commitmentReceiptDetails>
    ...
</bt:commitmentReceiptDetails>
```

Message binding extension element 36' preferably comprises one or more of the following: a transport extension attribute 37' and a process extension attribute 38'. Message binding extension element 36' may be used as an extension element in the WSDL element binding. The following is an example of message binding extension element 36':

```
<bt:biztalkBinding transport="http"
      processExtension="http://schemas.hp.com/web-services/biztalk/
      process_WSDLextension
      xmls:bt="http://schemas.hp.com/web-services/wsdl/biztalk"/>
```

According to the above example, web-services interface 18 specifies that "http" be used as the transport protocol for transmitting messages. Furthermore, a process extension as specified, for example at the URL http://schemas.hp.com/web-services/biztalk/process_WSDLextension may be used. The above example further specifies that the types of message acceptable by service provider 12 are those that comply with the messaging framework as specified, for example, by the URL http://schemas.hp.com/web-services/wsdl/biztalk, which is a URL that specifies a BizTalk messaging framework.

Binding details extension element 40' preferably comprises of one or more of the following: a topic extension element $40_1$', a packaging extension attribute $40_2$', a delivery receipt extension attribute $40_3$' and a commitment receipt extension attribute $40_4$'. Binding details extension element 40' may be used as an extension element in the WSDL elements binding, binding/operation, binding/operation/input, binding/operation/output, and binding/operation/fault. The following is an example of binding details extension element 40':

```
<bt:biztalkBindingDetails packaging="onepart-or-
    multipartRelated"delivery Receipt="required"
    commitmentReceipt="onDemand" />
```

According to the above example, packaging extension attribute $40_2$' has a value of "onepart-or-multipartRelated", which indicates that the sender of the message may decide which format to use for message packaging. Delivery receipt extension attribute $40_3$' has a value of "required" (deliveryReceipt="required"), which indicates that the message preferably includes a request for a delivery receipt. Commitment receipt extension attribute $40_4$' has a value of "onDemand" (commitmentReceipt="onDemand"), which indicates that the sender of the message may decide whether to request a commitment receipt. If the sender desires to receive the commitment receipt, then the sender may include a request for the commitment receipt in the message.

Commitment receipt details extension element 42' preferably comprises a commitment type extension element 44' which preferably comprises one or more of the following: a commitment code extension element $44_1$', a commitment detail extension element $44_2$' and a commitment body extension element $44_3$'. Commitment receipt details extension element 42' may be used as an extension element in the WSDL elements binding, binding/operation, binding/operation/input, binding/operation/output, and binding/operation/fault. The following is an example of commitment receipt details extension element 42':

```
<bt:commitmentReceiptDetails>
    <bt:commitmentType>
       ...
    </bt:commitmentType>
    <bt:commitmenType>
       ...
    </bt:commitmentType>
</bt:commitmentReceiptDetails>
```

The above example comprises two commitment type extension elements. Therefore, two types of commitment receipts are allowed. The following is an example of the first type of commitment receipt:

```
<bt:commitmentType>
    <bt:commitmentCode>
       <bt:codeValue>okay</bt:codeValue>
    </bt:commitmentCode>
    <bt:commitmentDetail message="porttypes:commitmessage"
    part="commitmentdetail"/>
    <bt:commitmentBody message="porttypes:commitmessage"
    parts="no1 no3" use="literal"/>
</bt:commitmentType>
```

According to the above example, the commitment receipt may have a value of "okay". According to a commitment details type parts extension attribute (part="commitmentdetail") of commitment detail extension element $44_2$' of the commitment receipt, the commitmentdetail part of the message commitmessage (porttypes:commitmessage) preferably appears within a header of the commitment receipt. According to a commitment body type parts extension attribute (parts="no1 no3") of commitment detail extension element $44_2$' of the commitment receipt, the no1 and no3 parts of the message commitmessage (porttypes:commitmessage) preferably appear within a body of the commitment receipt. A value of "literal" for the use attribute indicates that each part references a concrete schema definition using either the element or type attribute.

The following is an example of the second type of commitment receipt:

```
<bt:commitmenType>
    <bt:commitmentCode>
       <bt:codeValue>not_okay</bt:codeValue>
       <bt:codeValue>okay_withconditions</bt:codeValue>
    </bt:commitmentCode>
```

-continued

```
<bt:commitmentDetail message="porttypes:commitmessage"
    part="commitmentdetail"/>
<bt:commitmentBody message="porttypes:commitmessage"
    parts="no2" use="literal"/>
</bt:commitmentType>
```

According to the above example, the commitment receipt may have one of two values not_okay and okay_withconditions. According to a commitment details type parts extension attribute (part="commitmentdetail") of commitment detail extension element $44_2$' of the commitment receipt, the commitmentdetail part of the message commitmessage (porttypes:commitmessage) preferably appears within a header of the commitment receipt. According to a commitment body type parts extension attribute (parts="no2") of commitment detail extension element $44_2$' of the commitment receipt, the no2 part of the message commitmessage (porttypes:commitmessage) preferably appears within a body of the commitment receipt. A value of "literal" for the use attribute indicates that each part references a concrete schema definition using either the element or type attribute.

In accordance with an embodiment of the present invention, attachment extension 60 preferably comprises a plurality of elements. Preferably, attachment extension 60 comprises of the elements specified by schema 46 of FIG. 3B, such as a multipart related extension element 50'. The following is an example of multipart related extension element 50':

```
<output>
    <enhanced-mime:multipartRelated simpleAllowed="true"...>
        <enhanced-mime:part minOccurs="0" maxOccurs="n">
            ...
        </enhanced-mime:part>
        <enhanced-mime:part minOccurs="0" maxOccurs="1">
            ...
        </enhanced-mime:part>
    </enhanced-mime:multipartRelated>
</output>
```

Multipart related extension element 50' preferably comprises a part extension element $50_1$' and a simple allowed extension attribute $50_2$'. In the above example, the value of the simple allowed extension attribute $50_2$' is "true" (simpleAllowed="true"), which indicates that the output message may be a simple SOAP message if there are no attachments or a mime-multipart message if attachments are present.

The following are two examples of part extension element $50_1$':

```
<enhanced-mime:part minOccurs="0" maxOccurs="n">
    <mime:content part="picture" type="image/gif" />
</enhanced-mime:part>
<enhanced-mime:part minOccurs="0" maxOccurs="1" >
    <mime:content part="generalInformation" type="text/html" />
</enhanced-mime:part>
```

According to the above example, the message may comprise a picture and/or a general information document as attachments. The picture may be of type image/gif and the document may be of type text/html. Because the minimum occurrence value of both the part extension elements is zero, the attachments are optional. However, because the maximum occurrence value for the part extension element picture is "n" (maxOccurs="n"), the message may have a plurality of pictures as attachments. On the other hand, because the maximum occurrence value for the part extension element generalInformation is "1", the message may have one general information document as an attachment.

APPENDIX E provides a generic definition for a binding element extension for a web-services interface in accordance with schema 34 of FIG. 3A and schema 46 of FIG. 3B. In the generic definition in APPENDIX E, a '?' indicates an optional element, a '+' indicates an element that can occur one or more times, and an '*' indicates an element that can occur zero or more times.

FIGS. 5A-5D illustrate a flowchart of an exemplary method for processing, in accordance with an embodiment of the present invention, a message received by service provider 12. Method 70 is preferably executed by the service provider upon receipt of a message 20. At 72, a determination is made as to whether web-services interface 18 requires that the received message comprise a delivery receipt request. This determination may be made, for example, by determining whether the value of delivery receipt extension attribute $40_3$' in web-services interface 18 is set to "required". If the value of delivery receipt extension attribute $40_3$' is set to "required", then at 74, a determination is made as to whether the received message comprises a delivery receipt request. If the received message does not comprise a delivery receipt request, then in block 116 an error message may be transmitted to the service requestor. Otherwise, the process starting at 78 may be executed.

If in block 72 it is determined that web-services interface 18 does not require the received message to comprise a delivery receipt request, then at 76, a determination is made as to whether web-services interface 18 prohibits a delivery receipt request from being included in the received message. This determination may be made, for example, by determining whether the value of delivery receipt extension attribute $40_3$' in web-services interface 18 is set to "none". If the value of delivery receipt extension attribute $40_3$' is set to "none", then in block 80, a determination is made as to whether the received message comprises a delivery receipt request. If the received message comprises a delivery receipt request, then in block 116 an error message may be transmitted to the service requestor. Otherwise, the process starting at 78 may be executed. If in block 76 it is determined that web-services interface 18 does not prohibit a delivery receipt request to be included in the received message, then the process starting at 78 may be executed.

In block 78, a determination is made as to whether web-services interface 18 requires that the received message comprise a delivery commitment request. This determination may be made, for example, by determining whether the value of commitment receipt extension attribute $40_4$' in web-services interface 18 is set to "required". If the value of commitment receipt extension attribute $40_4$' is set to "required", then in block 82, a determination is made as to whether the received message comprises a delivery commitment request. If the received message does not comprise a delivery commitment request, then in block 116 an error message may be transmitted to the service requestor. Otherwise, the process starting at 86 may be executed.

If in block 78 it is determined that web-services interface 18 does not require the received message to comprise a delivery commitment request, then in block 84, a determination is made as to whether web-services interface 18 prohibits a delivery commitment request from being included in the received message. This determination may be made, for example, by determining whether the value of commitment receipt extension attribute $40_4'$ in web-services interface 18 is set to "none". If the value of commitment receipt extension attribute $40_4'$ is set to "none", then in block 86, a determination is made as to whether the received message comprises a commitment receipt request. If the received message comprises a commitment receipt request, then in block 116 an error message may be transmitted to the service requestor. Otherwise, the process starting at 86 may be executed. If in block 84 it is determined that web-services interface 18 does not prohibit a delivery commitment request to be included in the received message, then the process starting at 86 may be executed.

In block 86, a determination is made as to whether the transport protocol used for the received message corresponds to the transport protocol specified in transport extension attribute 37' of web-services interface 18. If the transport protocol used for the received message does not correspond to the transport protocol specified in transport extension attribute 37', then in block 116 an error message may be transmitted to the service requestor. Otherwise, in block 88, a determination is made as to whether the message comprises a process element. If the message does not comprise a process element, then the process starting at 94 may be executed. If the message comprises a process element, then in block 90, a determination is made as to whether web-services interface 18 comprises process extension attribute 38'. If web-services interface 18 does not comprise process extension attribute 38', then in block 116 an error message may be transmitted to the service requestor. Otherwise, in block 92, a determination is made as to whether the value of the process element of the message corresponds to the value of process extension attribute 38'. If the value of the process element of the message does not correspond to the value of process extension attribute 38', then in block 116 an error message may be transmitted to the service requestor. Otherwise, the process starting at 94 may be executed.

In block 94, a determination is made as to whether web-services interface 18 comprises packaging extension attribute $40_2'$. If web-services interface 18 does not comprise packaging extension attribute $40_2'$, then in block 96, a determination is made as to whether the received message is packaged according to a default packaging format, for example "multipartRelated", "onepart", "onepart-or-multipartRelated", and/or the like. If the received message is not packaged according to the default packaging format, then in block 116 an error message may be transmitted to the service requestor. Otherwise, the process starting at 100 may be executed.

If in block 94, it is determined that web-services interface 18 comprises packaging extension attribute $40_2'$, then in block 98, a determination is made as to whether the received message is packaged according to the format specified in packaging extension attribute $40_2'$. If the received message is not packaged according to the format specified in packaging extension attribute $40_2'$, then in block 116 an error message may be transmitted to the service requestor. Otherwise, the process starting at 100 may be executed.

In block 100, a determination is made as to whether web-services interface 18 comprises topic extension element $40_1'$. If web-services interface 18 does not comprise topic extension element $40_1'$, then in block 102, a determination is made as to whether a topic element field in the message is empty. If the topic element field in the message is not empty, then in block 116 an error message may be transmitted to the service requestor. Otherwise, the process starting at 106 may be executed.

If in block 100, it is determined that web-services interface 18 comprises topic extension element $40_1'$, then in block 104, a determination is made as to whether a topic field in the message correspond to the format specified in topic extension element $40_1'$. If the topic field in the message does not correspond to the format specified in topic extension element $40_1'$, then in block 116 an error message may be transmitted to the service requestor. Otherwise, the process starting at 106 may be executed.

In block 106, a determination is made as to whether the message includes an attachment. If the message does not include an attachment, then the process starting at 114 may be executed. Otherwise, in block 108 a determination is made as to whether the message element in web-services interface 18 comprises multiple parts. If the message element in web-services interface 18 does not comprise multiple parts, then in block 116 an error message may be transmitted to the service requestor. Otherwise, in block 110 a determination is made as to whether the parts in the message element describe the attachments to the message. If the parts in the message element do not describe the attachments to the message, then in block 116 an error message may be transmitted to the service provider. Otherwise, in block 112 a determination is made as to whether the format of the parts of the received message correspond to the format required by message binding extension element 36' of web-services interface 18. If the format of the parts of the received message does not correspond to the format required by message binding extension element 36', then in block 116 an error message may be transmitted to the service provider. Otherwise, the process starting at 114 may be executed. In block 114, the received message is processed.

The present invention may be implemented in software, hardware, or a combination of both software and hardware. The software and/or hardware may reside on web-services server 22 and/or service requestor agent 24.

If desired, the different functions discussed herein may be performed in any order and/or concurrently with each other. Furthermore, if desired, one or more of the above described functions may be optional or may be combined without departing from the scope of the present invention.

A technical advantage of an exemplary embodiment of the present invention is that a sender of a web-services message is able to determine whether or not the message was acceptable to the intended recipient. Another technical advantage of an exemplary embodiment of the present invention is that a provider of web-services may specify the format for web-service messages acceptable to the service provider.

APPENDIX

APPENDIX A

```xml
<xsd:schema targetNamespace="http://schemas.hp.com/web-services/wsdl/biztalk"
xmlns:bt="http://schemas.hp.com/webservices/wsdl/biztalk" ... >

<xsd:element name="biztalkBinding" type=" bt:biztalkBindingType">
    <xsd:annotation>
        <xsd:documentation>This is a WSDL extension element to be used as a child element
        in definitions/binding.</xsd:documentation>
    </xsd:annotation>
</xsd:element>

<xsd:complexType name="biztalkBindingType">
    <xsd:annotation>
        <xsd:documentation>This type denotes that this port type binding is a BizTalk
        binding.</xsd:documentation>
    </xsd:annotation>
    <xsd:attribute name="transport" type="bt:transportType" use="optional" default="http">
        <xsd:annotation>
            <xsd:documentation>Specifies the transport protocol to be
            used.</xsd:documentation>
        </xsd:annotation>
    </xsd:attribute>
    <xsd:attribute name="processExtension" type="xsd:anyURI" use="optional">
        <xsd:annotation>
            <xsd:documentation>Specifies the schema to be used for the element
            header/process/detail of the header of a message.
            </xsd:documentation>
        </xsd:annotation>
    </xsd:attribute>
</xsd:complexType>

<xsd:simpleType name="transportType">
    <xsd:annotation>
        <xsd:documentation>Specifies a possible transport protocol.</xsd:documentation>
    </xsd:annotation>
    <xsd: restriction base="xsd:NMTOKEN ">
        <xsd:enumeration value="http">
            <xsd:annotation>
                <xsd:documentation>The http transport binding as specified in a messaging
                framework, such as BizTalk may be used.</xsd:documentation>
            </xsd:annotation>
        </xsd:enumeration>
        <xsd:enumeration value="smtp">
            <xsd:annotation>
```

```
        <xsd:documentation>The smtp transport binding as specified in a messaging
        framework, such as BizTalk may be used.</xsd:documentation>
      </xsd:annotation>
    </xsd:enumeration>
  </xsd:restriction>
</xsd:simpleType>

<xsd:element name="biztalkBindingDetails" type="bt:biztalkBindingDetailsType">
  <xsd:annotation>
    <xsd:documentation>This is a WSDL extension element to be used as a child element
    in definitions/binding, definitions/binding/operation,
    definitions/binding/operation/input, definitions/binding/operation/output, and
    definitions/binding/operation/fault.</xsd:documentation>
  </xsd:annotation>
</xsd:element>

<xsd:complexType name="biztalkBindingDetailsType">
  <xsd:sequence>
    <xsd:element ref="bt:topic" minOccurs="0"/>
  </xsd:sequence>
  <xsd:attribute name=" packaging" type="bt:packagingType" use="optional"
  default="onepart-or-multipartRelated"/>
  <xsd:attribute name="deliveryReceipt" type="bt:receiptRequirementType"
  use="optional" default="onDemand"/>
  <xsd:attribute name="commitmentReceipt" type="bt:receiptRequirementType"
  use="optional" default="onDemand"/>
</xsd:complexType>

<xsd:simpleType name="packagingType">
  <xsd:restriction base="xsd:NMTOKEN">
    <xsd:enumeration value="onepart-or-multipartRelated">
      <xsd:annotation>
        <xsd:documentation>The sender of the message may determine if the message
        gets packaged as a simple SOAP message or into a MIME-multipart
        message.</xsd:documentation>
      </xsd:annotation>
    </xsd:enumeration>
    <xsd:enumeration value="onepart"/>
    <xsd:enumeration value="multipartRelated"/>
  </xsd:restriction>
</xsd:simpleType>

<xsd:simpleType name=" receiptRequirementType">
  <xsd:restriction base="xsd:NMTOKEN">
    <xsd:enumeration value="onDemand">
      <xsd:annotation>
```

```xml
            <xsd:documentation>It is up to the sender of the original message if the
            sender wants a receipt or not.</xsd:documentation>
        </xsd:annotation>
    </xsd:enumeration>
    <xsd:enumeration value="none">
        <xsd:annotation>
            <xsd:documentation>Receipt is not allowed and none may be
            requested.</xsd:documentation>
        </xsd:annotation>
    </xsd:enumeration>
    <xsd:enumeration value=" required">
        <xsd:annotation>
            <xsd:documentation>Receipt must be requested by the
            message.</xsd:documentation>
        </xsd:annotation>
    </xsd:enumeration>
    </xsd:restriction>
</xsd:simpleType>

<xsd:element name="topic" type="bt:topicRuleType">
    <xsd:annotation>
        <xsd:documentation>Specifies how to construct the value for the topic field and
        SOAP action field of the Biztalk header.</xsd:documentation>
    </xsd:annotation>
</xsd:element>

<xsd:complexType name="topicRuleType">
    <xsd:choice>
        <xsd:element name="string" type="xsd:string">
            <xsd:annotation>
                <xsd:documentation>Specifies the exact string to be inserted in the topic
                field.<xsd:documentation>
            </xsd:annotation>
        </xsd:element>
        <xsd:element name="schema" type="xsd:anyType">
            <xsd:annotation>
                <xsd:documentation>Provides a schema for the XML segment to be inserted
                as a string in the topic field.</xsd:documentation>
            </xsd:annotation>
        </xsd:element>
        <xsd:element name="XSL" type=" xsd:anyType">
            <xsd:annotation>
                <xsd:documentation>Provides a rule on how to construct the string for the
                topic field using XSL. </xsd:documentation>
            </xsd:annotation>
        </xsd:element>
    </xsd:choice>
```

```
</xsd:complexType>

<xsd:element name="commitmentReceiptDetails" type="bt:commitmentReceiptDetails
Type">
    <xsd:annotation>
        <xsd:documentation>Provides the details for the header and body of a commitment
        message. If part or all of the description is omitted, the respective fields in the
        commitment message are empty.</xsd:documentation>
    </xsd:annotation>
</xsd:element>

<xsd:complexType name="commitmentReceiptDetailsType">
    <xsd:sequence>
        <xsd:element name="commitmentType" maxOccurs="unbounded">
            <xsd:annotation>
                <xsd:documentation>Allows to specify a list of commitmentCodes and the
                commitmentDetail and commitmentBody content associated with
                it.</xsd:documentation>
            </xsd:annotation>
            <xsd:complexType>
                <xsd:sequence>
                    <xsd:element name="commitmentCode"
                    type="bt:commitmentCodeType">
                        <xsd:annotation>
                            <xsd:documentation>Specifies the value or a list of possible values
                            of the element commitmentCode associated with the header of a
                            commitment receipt.</xsd:documentation>
                        </xsd:annotation>
                    </xsd:element>
                    <xsd:element name="commitmentDetail"
                    type="bt:commitmentDetailType" minOccurs="0">
                        <xsd:annotation>
                            <xsd:documentation>Specifies the content of the commitment
                            Detail element in the SOAP header.</xsd:documentation>
                        </xsd:annotation>
                    </xsd:element>
                    <xsd:element name="commitmentBody" type="bt:commitmentBodyType"
                    minOccurs="0">
                        <xsd:annotation>
                            <xsd:documentation>Specifies the content of the SOAP body of
                            the commitment receipt.</xsd:documentation>
                        </xsd-annotation>
                    </xsd:element>
                </xsd:sequence>
            </xsd:complexType>
        </xsd:element>
    </xsd:sequence>
```

```
</xsd:complexType>

<xsd:complexType name= "commitmentCodeType">
    <xsd:sequence>
        <xsd:element name="codeValue" type="xsd:QName" minOccurs="0"
        maxOccurs="unbounded"/>
    </xsd:sequence>
</xsd:complexType>

<xsd:complexType name="commitmentDetailType">
    <xsd:sequence>
        <xsd:element name=" messageDigest" minOccurs="0">
            <xsd:annotation>
                <xsd:documentation>Provides details regarding the algorithms that may be
                used for calculating a digest. </xsd:documentation>
            </xsd:annotation>
            <xsd:complexType>
                <xsd:sequence>
                    <xsd:element name="digestMethod" type="xsd:anyURI"
                    default="http://www.w3.org/2000/09/xmldsig#sha1" minOccurs="0"
                    maxOccurs="unbounded"/>
                    <xsd:element name="canonicalizationMethod" type="xsd:anyURI"
                    default="http://www.w3.org/TR/2001/REC-xml-c14n-20010315"
                    minOccurs="0" maxOccurs="unbounded"/>
                </xsd:sequence>
            </xsd:complexType>
        </xsd:element>
    </xsd:sequence>

<xsd:attribute name="digestRequired" type="xsd:boolean" use="optional"
    default="false">
        <xsd:annotation>
            <xsd:documentation>Specifies whether the commitmentCode element has a
            digest subelement that contains the digest of a message being
            acknowledged.</xsd:documentation>
        </xsd:annotation>
    </xsd:attribute>

<xsd:attribute name=" message" type="xsd:QName" use="optional/>
        <xsd:annotation>
            <xsd:documentation>References a message defined in the web-services
            interface and points to the XML elements and/or data types that may be used
            in the commitment detail header element.</xsd:documentation>
        </xsd:annotation>
    </xsd:attribute>

<xsd:attribute name="parts" type="xsd:NMTOKENS" use="optional">
```

```
            <xsd:annotation>
                <xsd:documentation>Provides a list of the parts used from a message and
                points to the XML elements or data types that can be used in the commitment
                detail header element.</xsd:documentation>
            </xsd:annotation>
        </xsd:attribute>
</xsd:complexType>

<xsd:complexType name="commitmentBodyType">
        <xsd:attribute name="message" type="xsd:QName" use="required"/>
        <xsd:attribute name="parts" type="xsd:NMTOKENS" use="required"/>
        <xsd:attribute name="use" type="bt:useChoice" use="required"/>
        <xsd:attribute name= "encodingStyle" type="xsd:anyURI" use= "optional"/>
        <xsd:attribute name=" namespace" type="xsd:anyURI" use="optional"/>
</xsd:complexType>

<xsd:simpleType name=" useChoice">
    <xsd:annotation>
        <xsd:documentation>Corresponds to the WSDL SOAP binding useChoice
        type.</xsd:documentation>
    </xsd:annotation>
    <xsd:restriction base=" xsd:string">
        <xsd:enumeration value="literal"/>
        <xsd:enumeration value="encoded"/>
    </xsd:restriction>
</xsd:simpleType>
</xsd:schema>
```

APPENDIX B

```
<bt:biztalkBinding transport="http"
        processExtension="http://schemas.hp.com/web-services/biztalk/process_WSDLex
        tension"
        xmls:bt="http://schemas.hp.com/web-services/wsdl/biztalk"/>
<bt:biztalkBindingDetails packaging="onepart-or-multipartRelated"
            deliveryReceipt="required" commitmentReceipt="onDemand" />
<bt:commitmentReceiptDetails>
    <bt:commitmentType>
        <bt:commitmentCode>
            <bt:codeValue>okay</bt:codeValue>
        </bt:commitmentCode>
        <bt:commitmentDetail message="porttypes:commitmessage" part="commit
        mentdetail"/>
        <bt:commitmentBody message="porttypes:commitmessage" parts="no1 no3"
        use="literal"/>
    </bt:commitmentType>
    <bt:commitmenType>
        <bt:commitmentCode>
            <bt:codeValue>not_okay</bt:codeValue>
            <bt:codeValue>okay_withconditions</bt:codeValue>
        </bt:commitmentCode>
        <bt:commitmentDetail message="porttypes:commitmessage" part="commitment
        detail"/>
        <bt:commitmentBody message="porttypes:commitmessage" parts="no2" use=
        "literal"/>
    </bt:commitmentType>
</bt:commitmentReceiptDetails>
```

APPENDIX C

```xml
<xsd:schema targetNamespace="http://schemas.hp.com/web-services/wsdl/enhanced-mime"
xmlns:enhanced-mime="http://schemas.hp.com/web-services/wsdl/enhanced-mime" ...>

<xsd:element name="multipartRelated" type="enhanced- mime: multipartRelatedType"/>
    <xsd:complexType name="multipartRelatedType">
        <xsd:choice>
            <xsd:element ref ="enhanced-mime: part" minOccurs="0"
            maxOccurs="unbounded"/>
            <xsd:element ref ="mime:part" minOccurs="0" maxOccurs="unbounded"/>
        </xsd:choice>
    <xsd:attribute name="simpleAllowed" type="xsd:boolean" default="false"/>
    </xsd:complexType>

<xsd:element name="part" type="enhanced-mime: partType"/>
        <xsd:complexType name="partType">
            <xsd:sequence>
                <xsd:any namespace="targetNamespace" minOccurs="0"
                maxOccurs="unbounded"/>
            </xsd:sequence>
            <xsd:attribute name=" minOccurs" type="xsd:nonNegativeInteger"
            use="optional" default="1"/>
            <xsd:attribute name=" maxOccurs" use="optional" default="1">
                <xsd:simpleType name="allNNI">
                    <xsd:union memberTypes="xsd:nonNegativeInteger">
                        <xsd:simpleType>
                        <xsd:restriction base="xsd:NMTOKEN">
                        <xsd:enumeration value="unbounded"/>
                        </xsd:restriction>
                        </xsd:simpleType>
                    </xsd:union>
                </xsd:simpleType>
            </xsd:attribute>
        </xsd:complexType>
</xsd:schema>
```

APPENDIX D

```
<output>
    <enhanced-mime:multipartRelated simpleAllowed="true" ... >
        <enhanced-mime:part minOccurs="0" maxOccurs="n">
            <mime:content part="picture" type="image/gif" />
        </enhanced-mime:part>
        <enhanced-mime:part minOccurs="0" maxOccurs="1" >
            <mime:content part="generalInformation" type="text/html" />
        </enhanced-mime:part>
    </enhanced-mime:multipartRelated>
</output>
```

APPENDIX E

```
<bt:biztalkBinding transport="http|smtp" processExtension="anyURI"? />

<bt:biztalkBindingDetails
        packaging="onepart-or-multipartRelated|onepart|multipartRelated"?
        deliveryReceipt="onDemand|none|required"?
        commitmentReceipt="onDemand|none|required"? >
    <bt:topic>
        <bt:string>exact string that goes into topic field</bt:string> |
        <bt:schema>a schema for the XML segment that has to be put as a string into the
        topic field</bt:schema> |
        <bt:XSL>XSL that specifies what goes into the topic field</bt:XSL>
    </bt:topic> ?
</bt:biztalkBindingDetails>

<bt:commitmentReceiptDetails>
    <bt:commitmentType>
        <bt:commitmentCode> <bt:codeValue>qname</bt:codeValue> *
        </bt:commitmentCode>
        <bt:commitmentDetail      digestRequired="true|false"?      message="qname"?
        parts="nmtokens"?>
            <bt:messageDigest>
                <bt:digestMethod>anyURI</bt:digestMethod>*
                <bt:canonicalizationMethod>anyURI</bt:canonicalizationMethod>*
            </bt:messageDigest>?
        </bt:commitmentDetail>?
        <bt:commitmentBody            message="qname"            parts="nmtokens"?
        use="literal|encoded"?encodingStyle="uri-list"? namespace="uri"? />?
    </bt:commitmentType>+
</bt:commitmentReceiptDetails>
...
<enhanced-mime:multipartRelated simpleAllowed="true | false"
        xmlns:enhanced-mime="http://schemas.hp.com/web-services/wsdl/enhanced-
        mime" >
    <mime:part>
        <soap:body parts="nmtokens"? use="literal|encoded"?
        encodingStyle="uri-list"? namespace="uri"?>
    </mime:part> |
    <enhanced-mime:part minOccurs="number"? maxOccurs="number | n"?> *
        <mime:content    part="nmtoken"?    type="string"?/>    |    <mime:mimeXml
        part="nmtoken"?/>| <any/>
    </enhanced-mime:part>
</enhanced-mime:multipartRelated>?
```

What is claimed is:

1. A web-services provider, comprising:
a web server for hosting web-services provided by the web services provider, the web services provider providing a web-services interface accessible by a web-services requestor over a network, the web-services interface defining:
a message binding extension element operable to specify a format for a message transmitted to the web-services provider by the web-services requestor requesting said web-service; and
a binding details extension element operable to specify an availability status of at least one receipt for said message,
wherein the web server determines whether the message includes a valid delivery receipt request by determining whether the web-services interface requires a delivery receipt request to be included in the message by checking an attribute of the binding details extension element in the web-services interface, and if not, determining whether the web-services interface prohibits the delivery receipt request from being included in the message by checking the attribute.

2. The web-services provider of claim 1, wherein the web-services interface comprises a commitment receipt details extension element operable to specify details regarding said at least one receipt.

3. The web-services provider of claim 1, wherein the web-services interface comprises a transport extension attribute operable to specify a transport protocol for transmitting said message.

4. The web-services provider of claim 3, wherein a value of said transport extension attribute is selected from the group consisting of "http" and "smtp".

5. The web-services provider of claim 1, wherein said message comprises a request for said at least one receipt.

6. The web-services provider of claim 1, wherein said at least one receipt is selected from the group consisting of a delivery receipt and a commitment receipt.

7. The web-services provider of claim 1, wherein said at least one receipt comprises a delivery receipt operable to indicate acceptance of said message by an intended recipient of said message.

8. The web-services provider of claim 1, wherein said at least one receipt comprises a commitment receipt operable to indicate a commitment for processing of said message by an intended recipient of said message.

9. The web-services provider of claim 1, wherein the web-services interface comprises a packaging extension attribute operable to specify a packaging type for packaging said message.

10. The web-services provider of claim 1, wherein the web-services interface comprises a packaging extension attribute operable to specify that a packaging type for said message is determined by a sender of said message.

11. The web-services provider of claim 1, wherein the web-services interface comprises a packaging extension attribute operable to specify that said message is part of a multipart message.

12. The web-services provider of claim 1, wherein the web-services interface comprises a delivery receipt extension attribute operable to specify that said at least one receipt comprises a delivery receipt for indicating acceptance of said message by an intended recipient of said message.

13. The web-services provider of claim 1, wherein the web services interface comprises a commitment receipt extension attribute operable to specify that said at least one receipt comprises a commitment receipt for indicating a commitment for processing of said message by an intended recipient of said message.

14. The web-services provider of claim 1, wherein the web-services interface comprises a commitment code extension element operable to specify at least one value for inclusion in a header of said at least one receipt.

15. The web-services provider of claim 1, wherein the web-services interface comprises a commitment detail extension element operable to specify contents specific to said web-service for inclusion in a header of said at least one receipt.

16. The web-services provider of claim 1, wherein the web-services interface comprises:
a commitment details type message attribute operable to reference said message; and
a commitment details type parts attribute operable to specify at least one part of said message for inclusion in a header of said at least one receipt.

17. The web-services provider of claim 1, wherein the web-services interface comprises a commitment body extension element operable to specify contents specific to said web-service in a body of said at least one receipt.

18. The web-services provider of claim 1, wherein the web-services interface comprises:
a commitment body type message attribute operable to reference said message; and
a commitment body type parts attribute operable to specify at least one part of said message for inclusion in a body of said at least one receipt.

19. A web-services provider, comprising:
a web server for hosting web-services provided by the web services provider, the web services provider providing a web-services interface accessible by a web-services requestor over a network, the web-services interface defining:
a binding details extension element operable to specify an availability status of at least one receipt for a message transmitted to the web-services provider by the web-services requestor requesting said web-service; and
a commitment receipt details extension element operable to specify whether said at least one receipt is one of the group consisting of a delivery receipt and a commitment receipt,
wherein the web server determines whether the message includes a valid delivery receipt request by determining whether the web-services interface requires a delivery receipt request to be included in the message by checking an attribute of the binding details extension element in the web-services interface, and if not, determining whether the web-services interface prohibits the delivery receipt request from being included in the message by checking the attribute.

20. The web-services provider of claim 19, wherein said message comprises a request for said at least one receipt.

21. A method for defining a web-service, comprising: hosting web-services provided by the web services provider, the web services provider providing a web-services interface accessible by a web-services requestor over a network, the web-services:
specifying a format for a message requesting said web-service;
specifying an availability status of at least one receipt for said message; and
determining whether the message includes a valid delivery receipt request by determining whether the web-service requires a delivery receipt request to be included in the message by checking an attribute of a binding details extension element in the web-services interface, and if not, determining whether the web-service prohibits the delivery receipt request from being included in the message by checking the attribute.

22. The method of claim 21, further comprising specifying whether said at least one receipt is one of the group consisting of a delivery receipt and a commitment receipt.

23. The method of claim 21, further comprising specifying a transport
protocol for transmitting said message.

24. The method of claim 21, further comprising specifying a packaging type for packaging said message.

25. The method of claim 21, further comprising specifying that a packaging type for said message is determined by a sender of said message.

26. The method of claim 21, further comprising specifying that said message is part of a multipart message.

27. The method of claim 21, further comprising specifying that said at least one receipt comprises a delivery receipt for indicating acceptance of said message by an intended recipient of said message.

28. The method of claim 21, further comprising publishing the specified format.

29. The method of claim 21, further comprising specifying that said at least one receipt comprises a commitment receipt for indicating a commitment for processing of said message by an intended recipient of said message.

30. The method of claim 21, thither comprising specifying at least one value for inclusion in a header of said at least one receipt.

31. The method of claim 21, further comprising specifying contents specific to said web-service for inclusion in a header of said at least one receipt.

32. The method of claim 21, further comprising:
referencing said message; and
specifying at least one part of said message for inclusion in a header of said at least one receipt.

33. The method of claim 21, further comprising specifying contents specific to said web-service for inclusion in a body of said at least one receipt.

34. The method of claim 21, further comprising:
referencing said message; and
specifying at least one part of said message for inclusion in a body of said at least one receipt.

35. A method for providing a web-service, comprising:
determining whether a web-services message is in a specified format;
determining whether said web-services message comprises a valid delivery receipt request by determining whether the web-service requires a delivery receipt request to be included in the web-services message by checking an attribute of a binding details extension element in a web-services interface, and if not, determining whether the web-service prohibits the delivery receipt request from being included in the web-services message by checking the attribute; and
processing said web-services message in response to said web-services message being in said specified format and comprising a valid delivery receipt request.

36. The method of claim 35, further comprising comparing a process element of said web-services message with a process extension attribute for said web-service listed in a web-services interface to determine whether said web-services message is in said specified format.

37. The method of claim 35, wherein said determining whether said web-services message comprises a valid delivery receipt request comprises:
processing said web-services message in response to said web-services message including said delivery receipt request and upon determining that said web-services interface requires said web-services message to include said delivery receipt request.

38. The method of claim 35, wherein said determining whether said web-services message comprises a valid delivery receipt request comprises:
processing said web-services message in response to said web-services message not including said delivery receipt request and upon determining that said web-services interface prohibits said delivery receipt request from being included in said web-services message.

39. The method of claim 35, further comprising:
determining whether a web-services interface prohibits a delivery commitment request from being included in said web-services message; and
processing said web-services message in response to said web-services message not including said delivery commitment request and upon determining that said web-services interface prohibits said delivery commitment request from being included in said web-services message.

40. The method of claim 35, further comprising transmitting an error message in response to said web-services message comprising an invalid delivery receipt request.

41. The method of claim 35, further comprising processing said web-services message in response to said web-services message being packaged in accordance with a packaging format specified in a packaging extension attribute of a web-services interface.

42. A method for providing a web-service, comprising:
receiving a web-services message from a web-services requestor;
determining a value of a delivery receipt extension attribute of a web-services interface published by a web-services provider;
determining whether said web-services message comprises a valid delivery receipt request by determining whether the web-service requires a delivery receipt request to be included in the web-services message by checking an attribute of a binding details extension element in the web-services interface, and if not, determining whether the web-service prohibits the delivery receipt request from being included in the web-services message by checking the attribute;
responsive to determining that the value indicates that a delivery receipt request is prohibited from being included in a web-services message, determining whether the received web-services message includes a delivery receipt request; and
responsive to determining that the received web-services message does not include a delivery receipt request, processing the web-services message.

43. A method for providing a web-service, comprising:
receiving a web-services message from a web-services requestor;
determining a value of a delivery receipt extension attribute of a web-services interface published by a web-services provider;
determining whether said web-services message comprises a valid delivery receipt request by determining whether the web-service requires a delivery receipt request to be included in the web-services message by checking an attribute of a binding details extension element in the web-services interface, and if not, determining whether the web-service prohibits the delivery receipt request from being included in the web-services message by checking the attribute;

responsive to determining that the value indicates that a delivery receipt request is required in a web-services message, determining whether the received web-services message includes a delivery receipt request; and responsive to determining that the received web-services message includes a delivery receipt request, processing the web-services message.

44. A web-services server having software residing thereon, the software, when executed by the web-services server, causes the web-services server to:

in response to receiving a web-services message from a web-services requestor, determine a value of a delivery receipt extension attribute of a web-services interface published by a web-services provider;

determine whether said web-services message comprises a valid delivery receipt request by determining whether the web-service requires a delivery receipt request to be included in the web-services message by checking an attribute of a binding details extension element in the web-services interface, and if not, determining whether the web-service prohibits the delivery receipt request from being included in the web-services message by checking the attribute;

in response to determining that the value indicates that a delivery receipt request is required in a web-services message, determine whether the received web-services message includes a delivery receipt request; and in response to determining that the received web-services message includes a delivery receipt request, process the web-services message.

* * * * *